Dec. 8, 1942.                A. L. ROSENMUND                2,304,510
                              BOX MAKING MACHINE
                            Filed Aug. 1, 1940         18 Sheets-Sheet 1
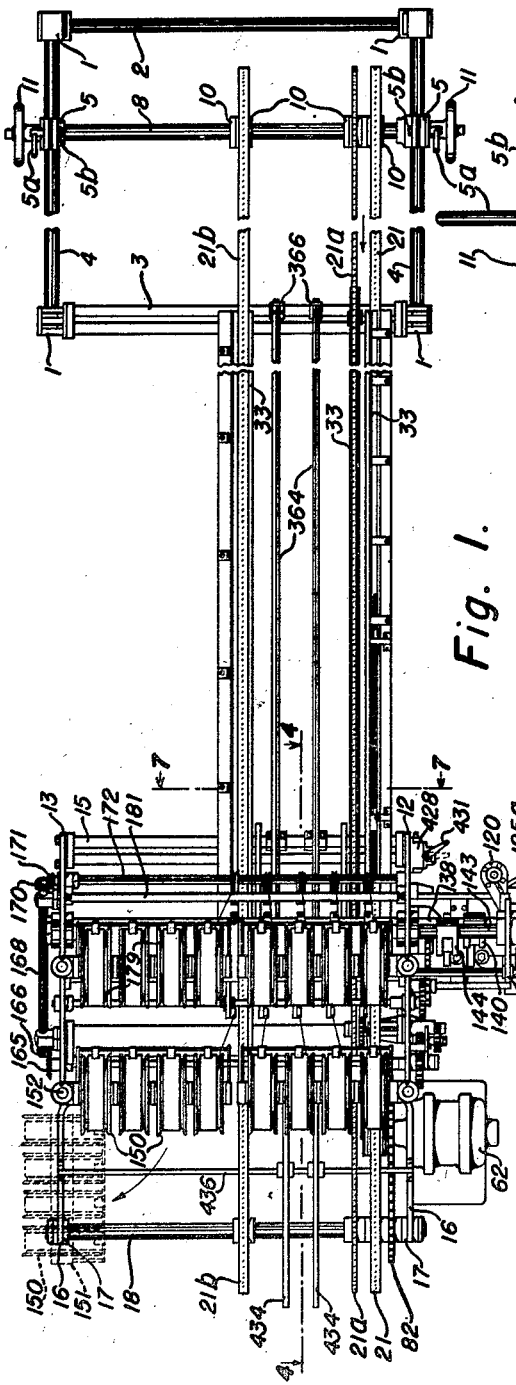
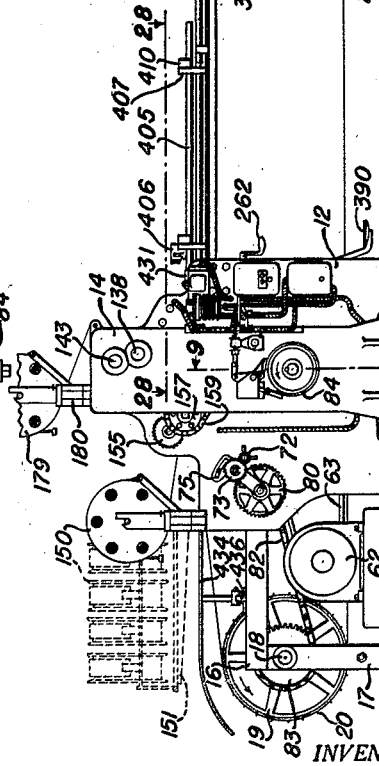
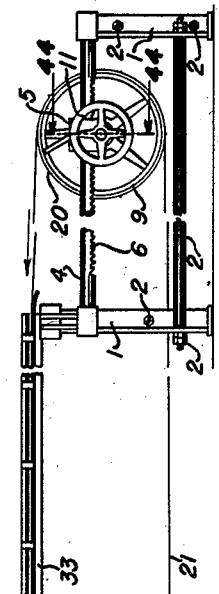
INVENTOR.
Alfred L. Rosenmund.
BY Edward F. Dunne
ATTORNEY.

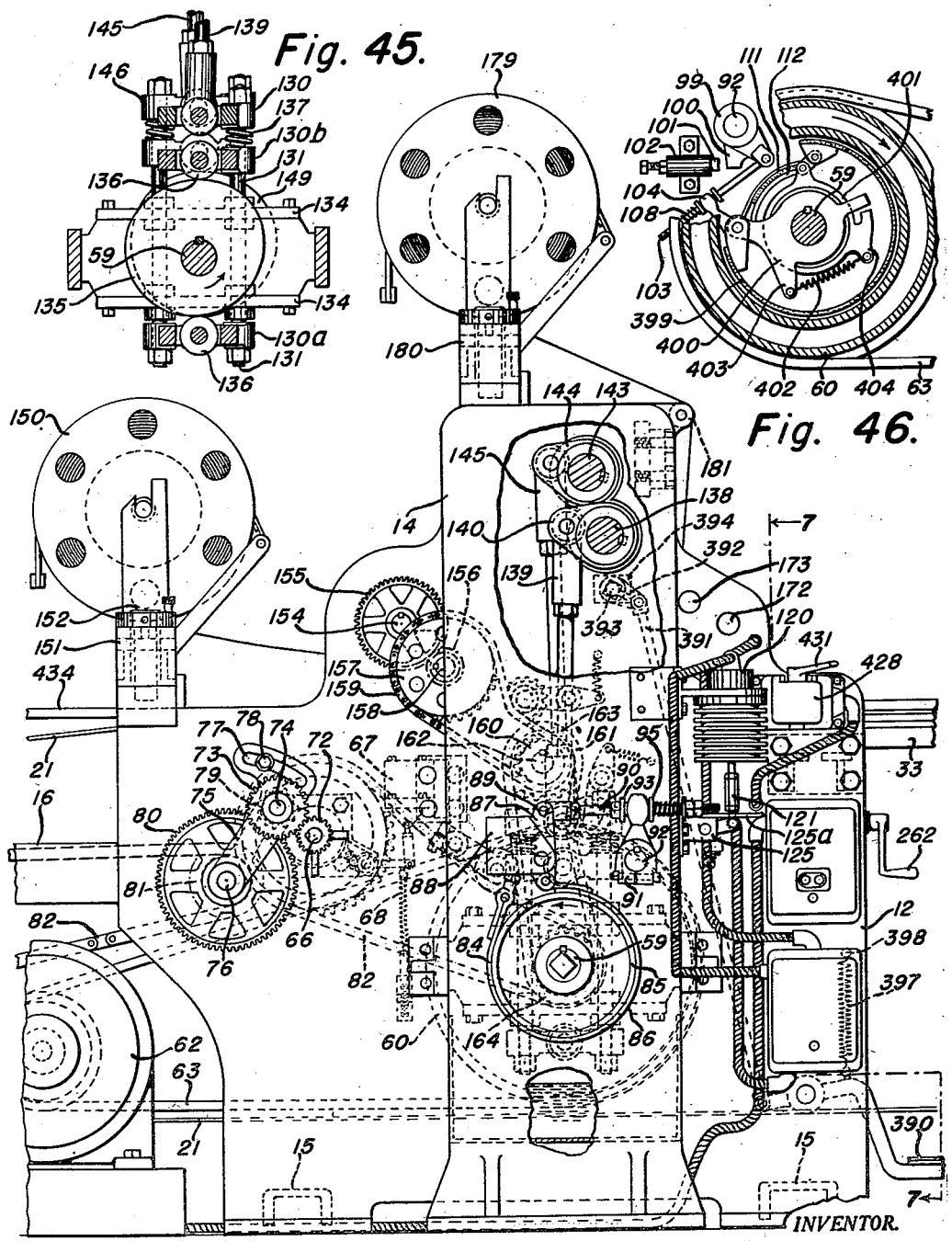

Dec. 8, 1942.  A. L. ROSENMUND  2,304,510
BOX MAKING MACHINE
Filed Aug. 1, 1940  18 Sheets-Sheet 3
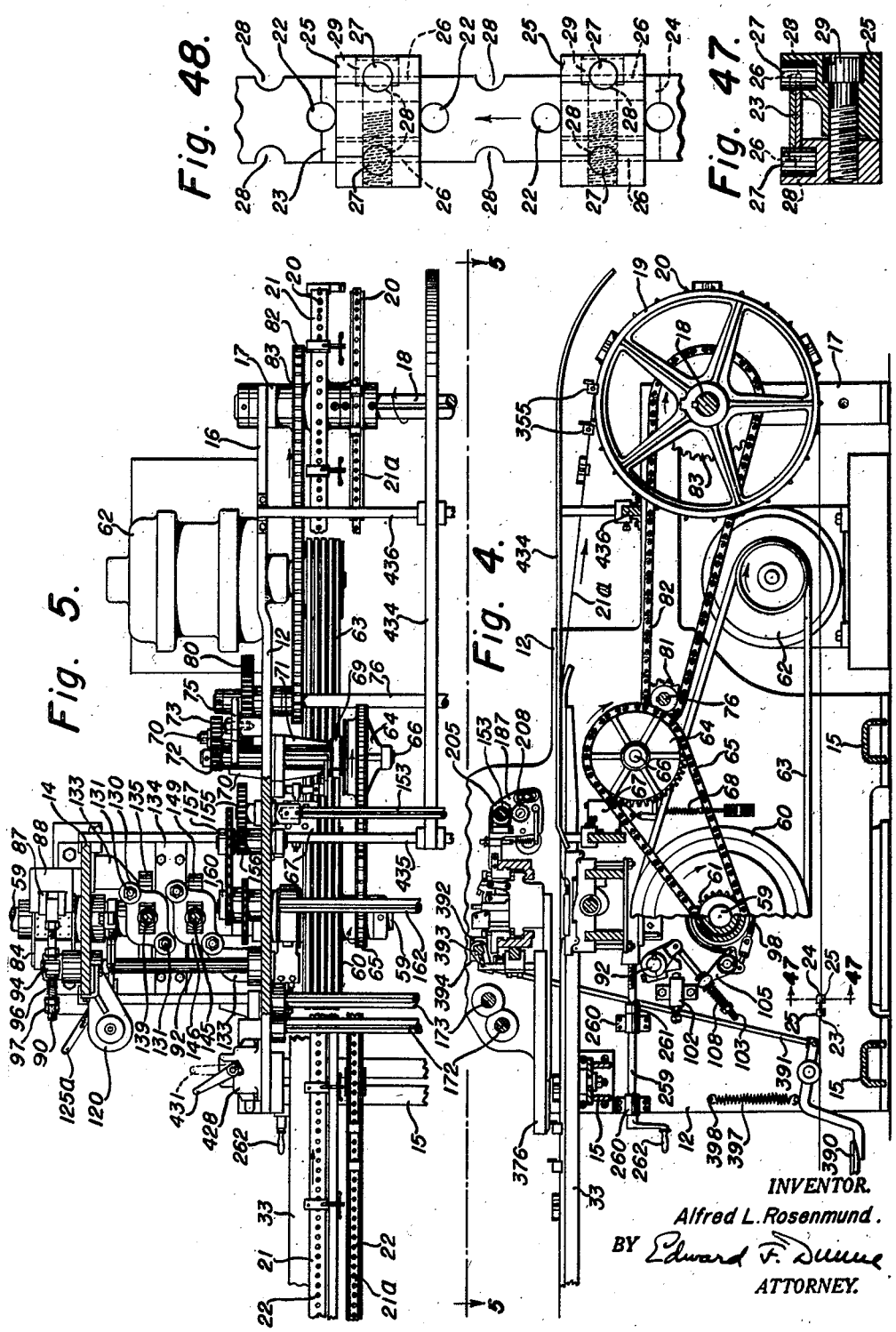
INVENTOR.
Alfred L. Rosenmund.
BY Edward F. Dunne
ATTORNEY.

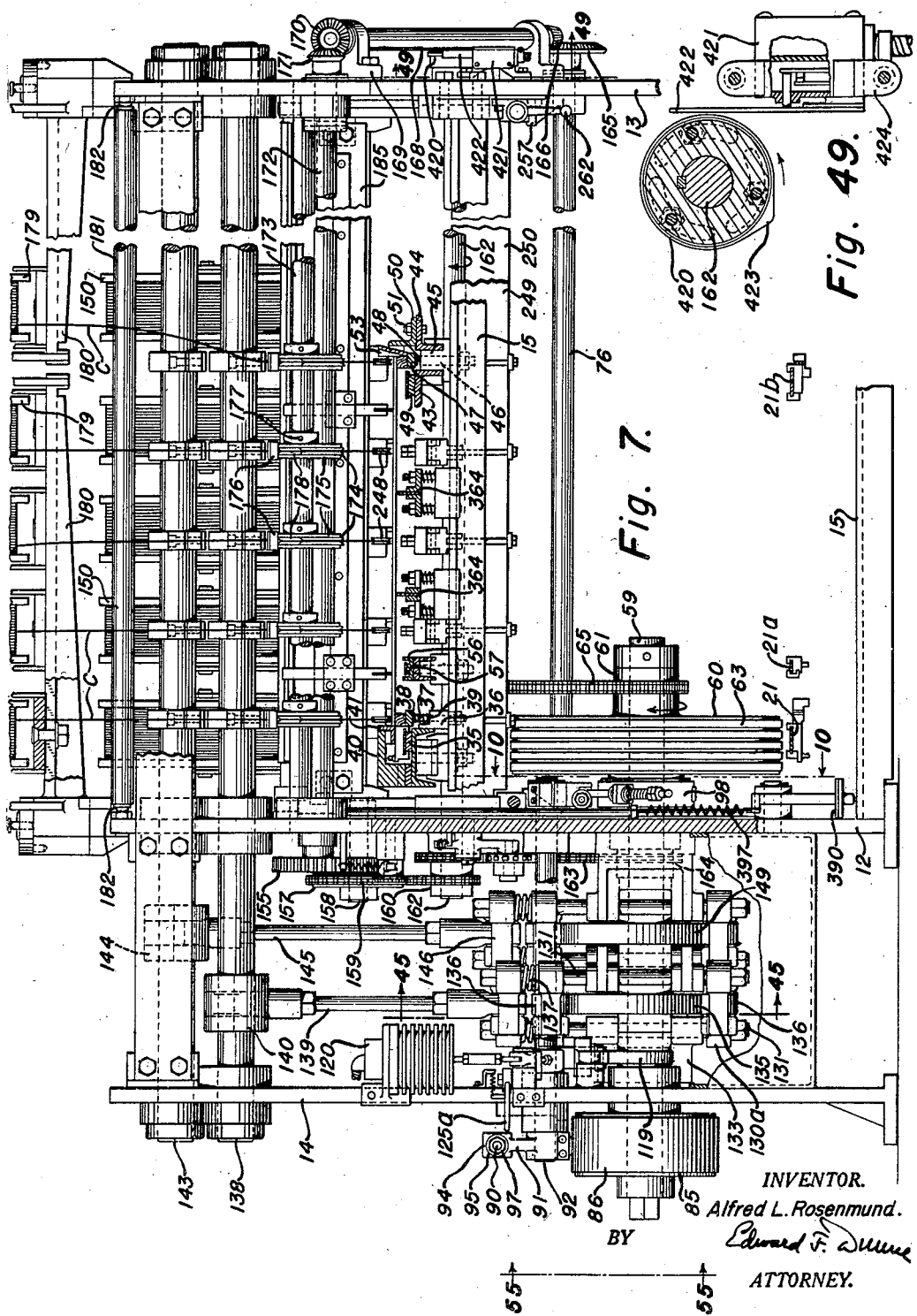

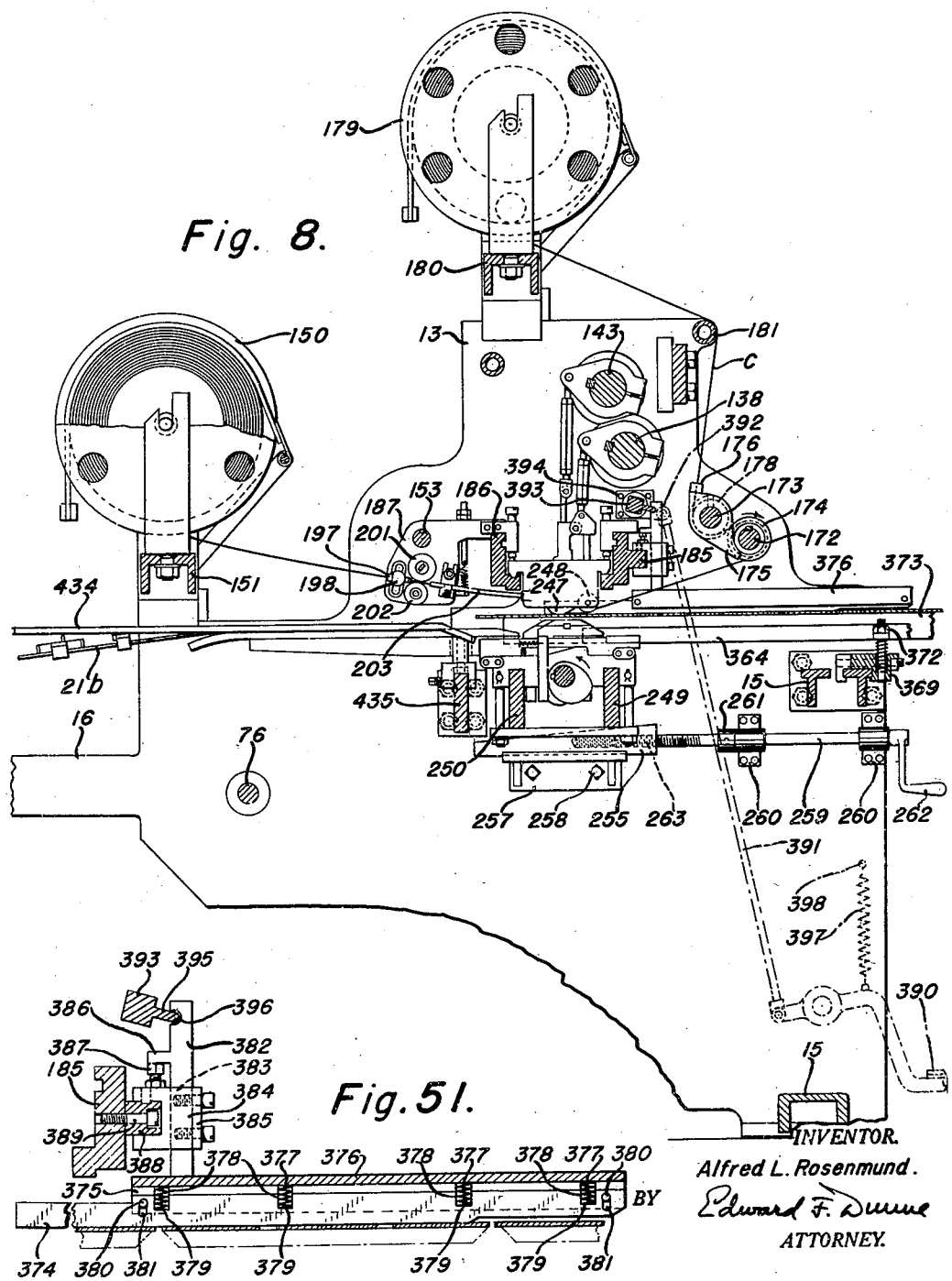

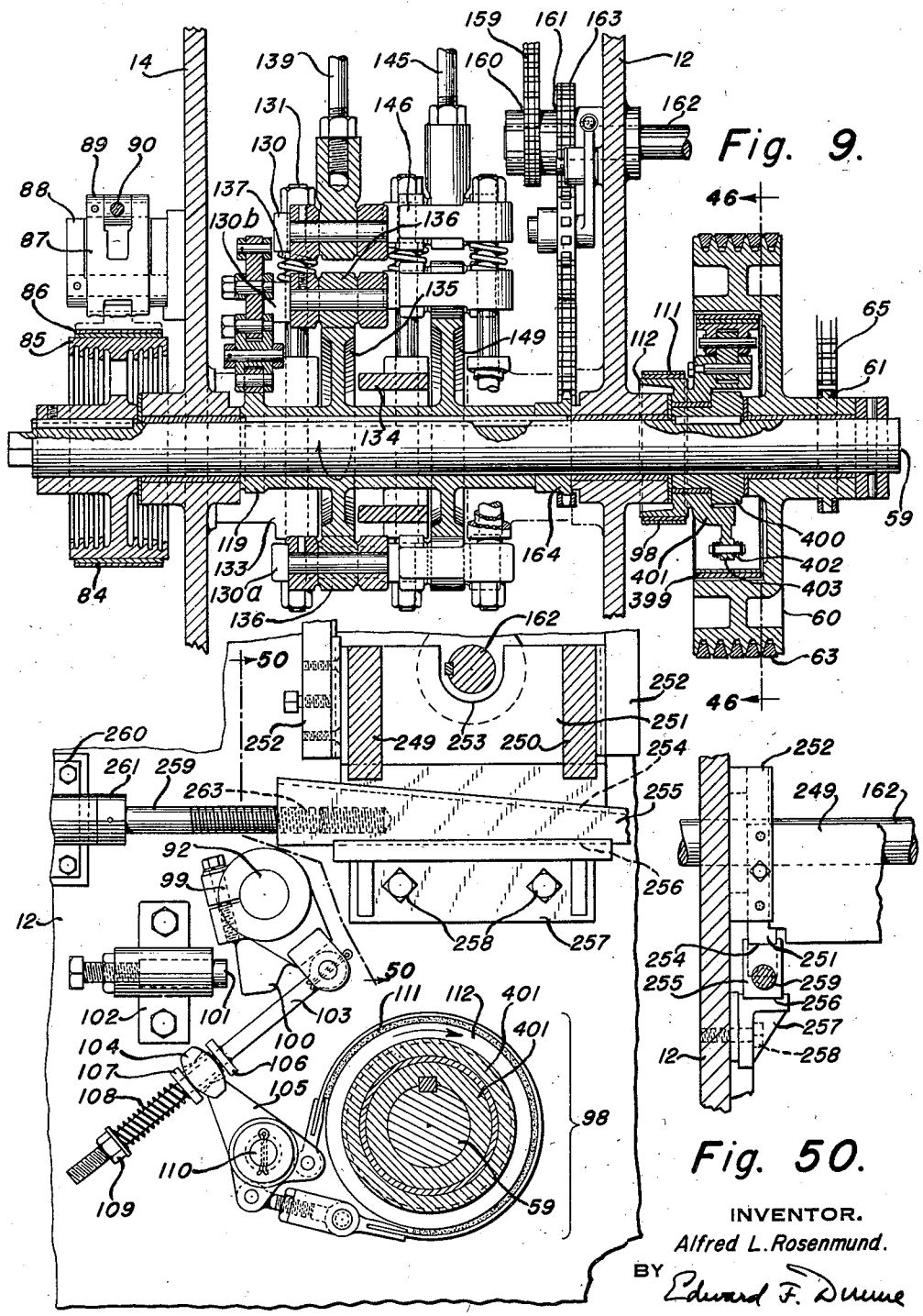

Dec. 8, 1942.    A. L. ROSENMUND    2,304,510
BOX MAKING MACHINE
Filed Aug. 1, 1940    18 Sheets-Sheet 8
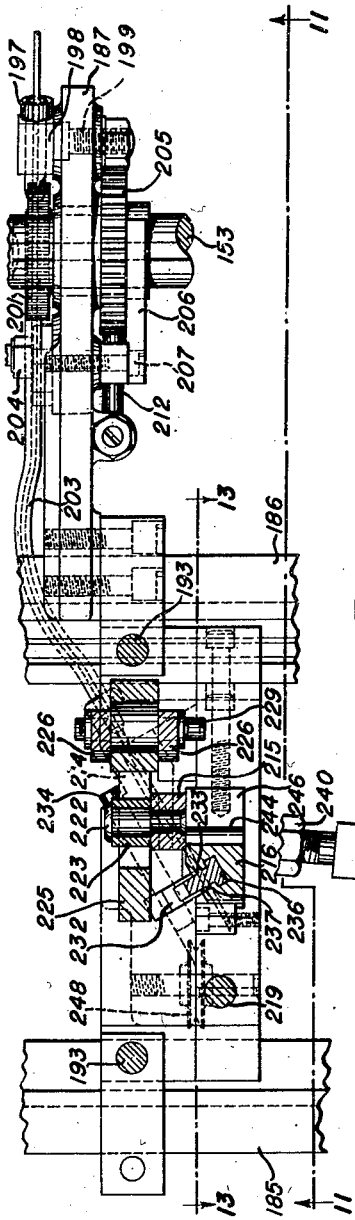
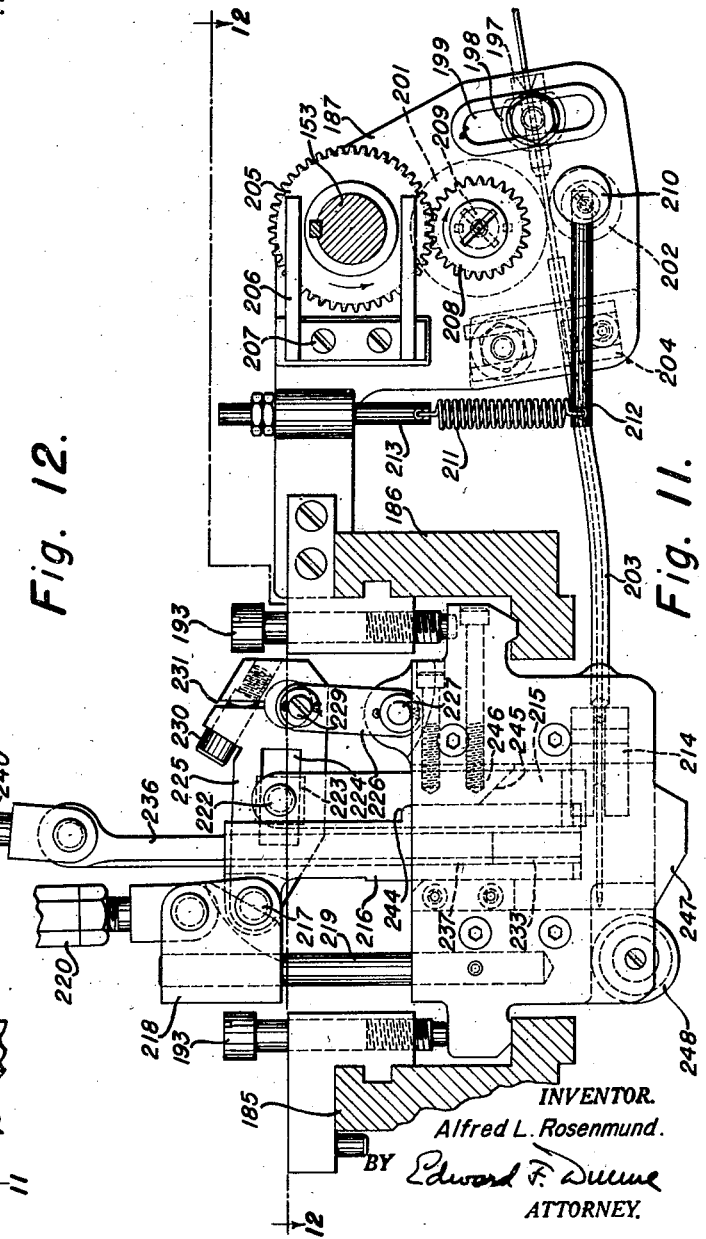
INVENTOR.
Alfred L. Rosenmund.
BY Edward F. Dunne
ATTORNEY.

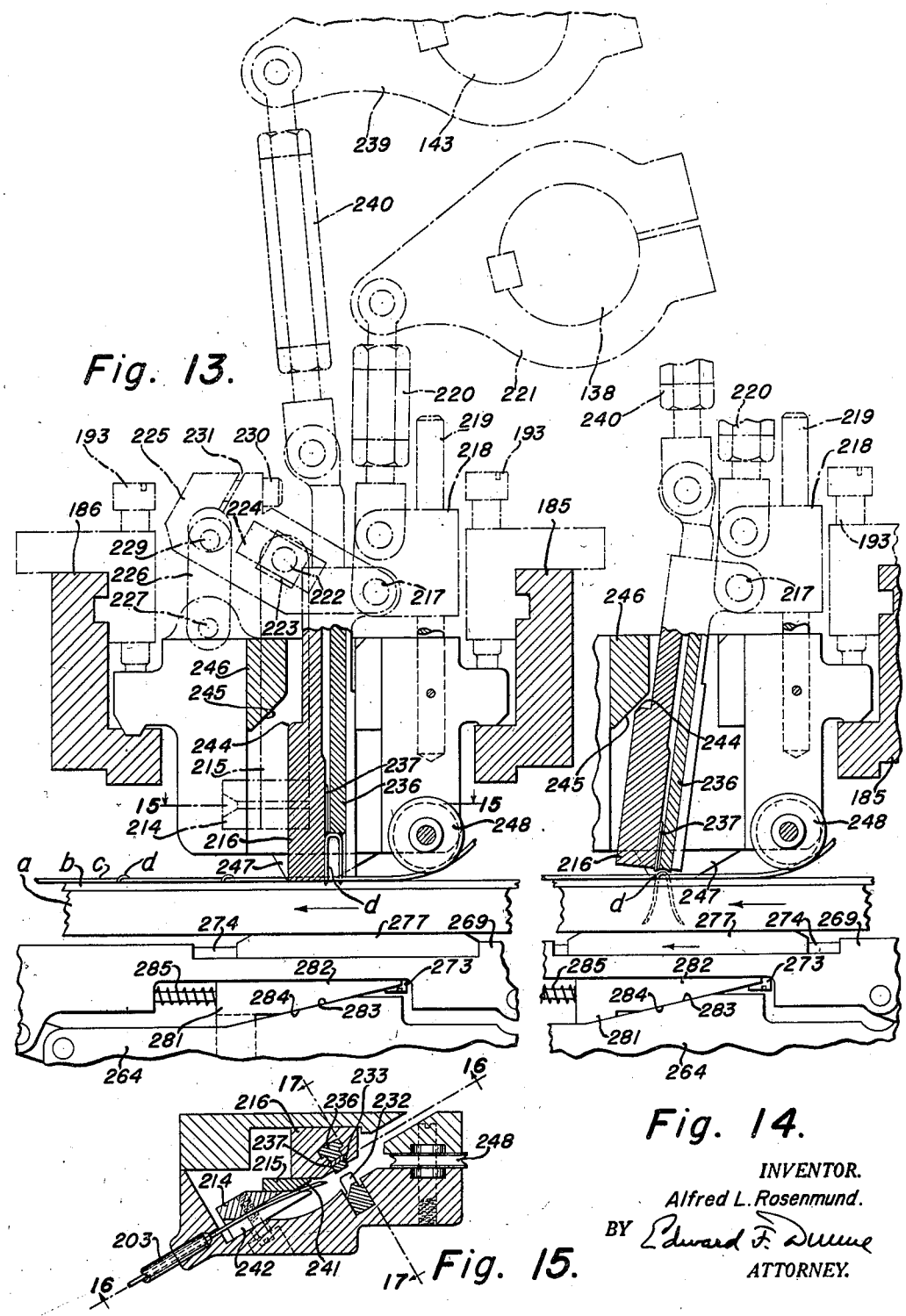

Dec. 8, 1942. A. L. ROSENMUND 2,304,510
BOX MAKING MACHINE
Filed Aug. 1, 1940 18 Sheets-Sheet 10
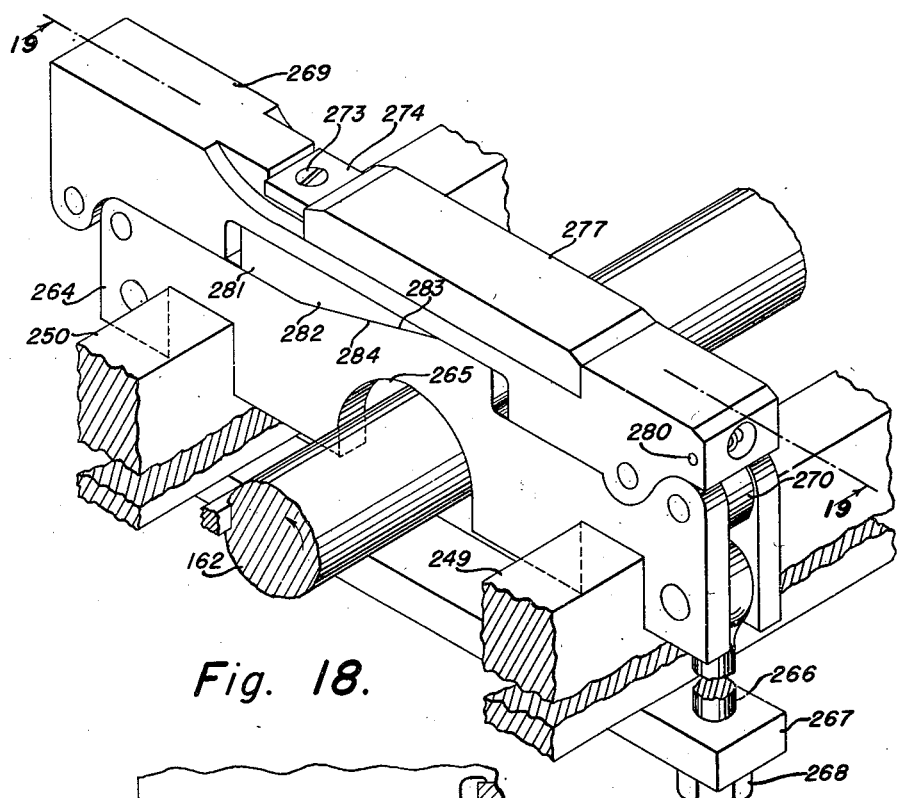
Fig. 18.
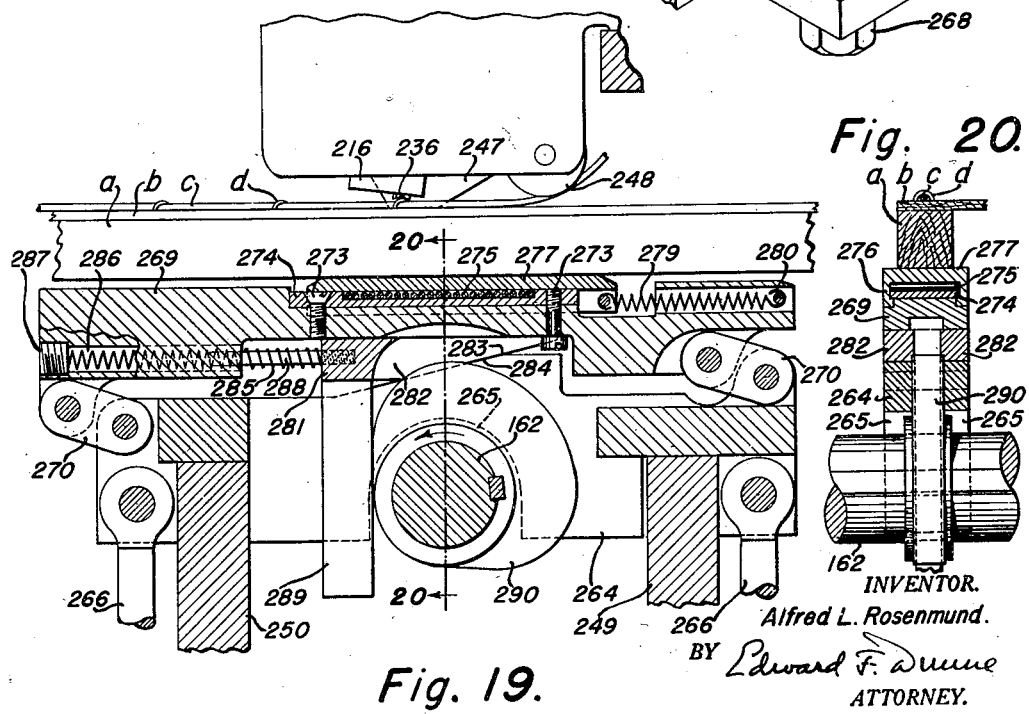
Fig. 20.
Fig. 19.
INVENTOR.
Alfred L. Rosenmund.
BY Edward F. Dunne
ATTORNEY.

Dec. 8, 1942.  A. L. ROSENMUND  2,304,510
BOX MAKING MACHINE
Filed Aug. 1, 1940   18 Sheets-Sheet 11

INVENTOR.
Alfred L. Rosenmund.
BY Edward F. Dunne
ATTORNEY.

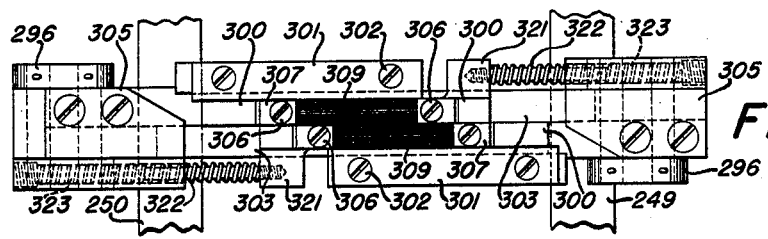
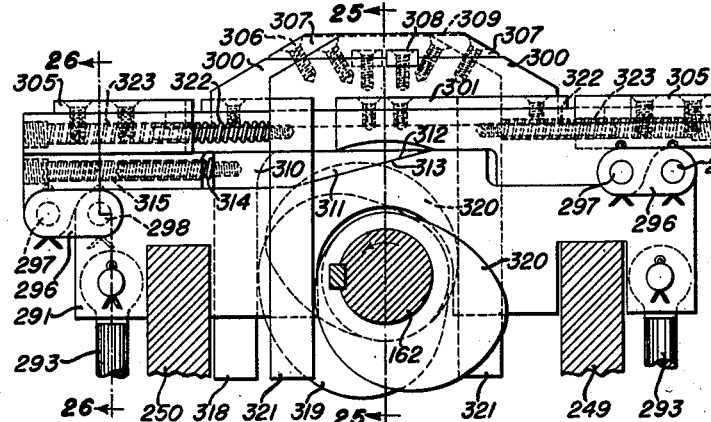
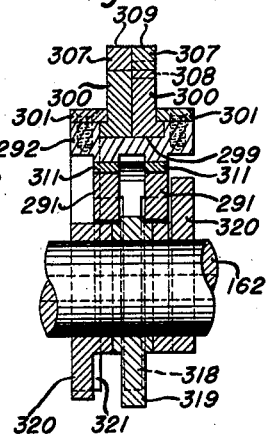
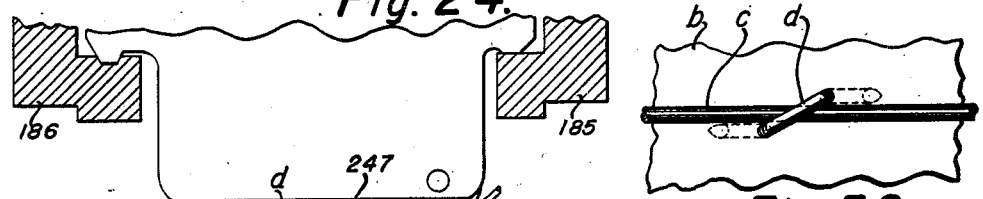
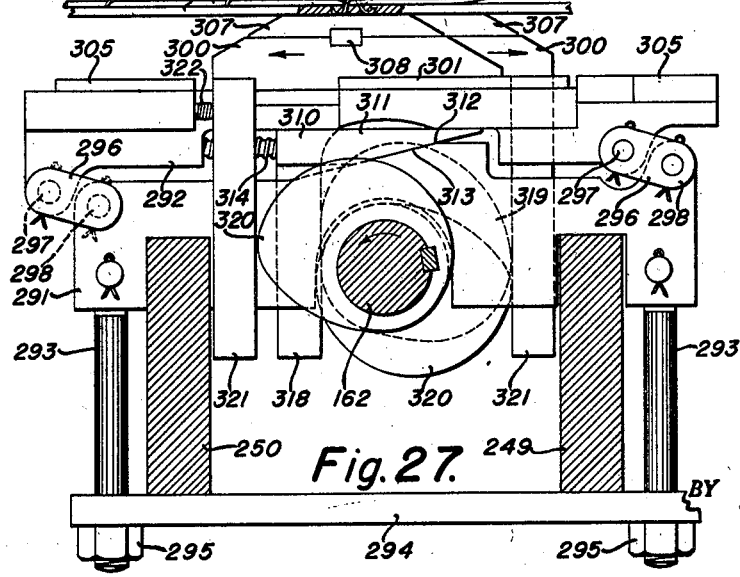
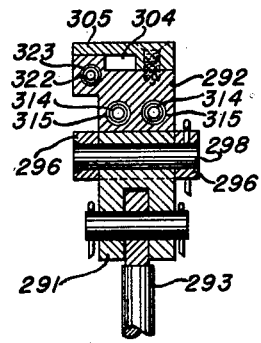

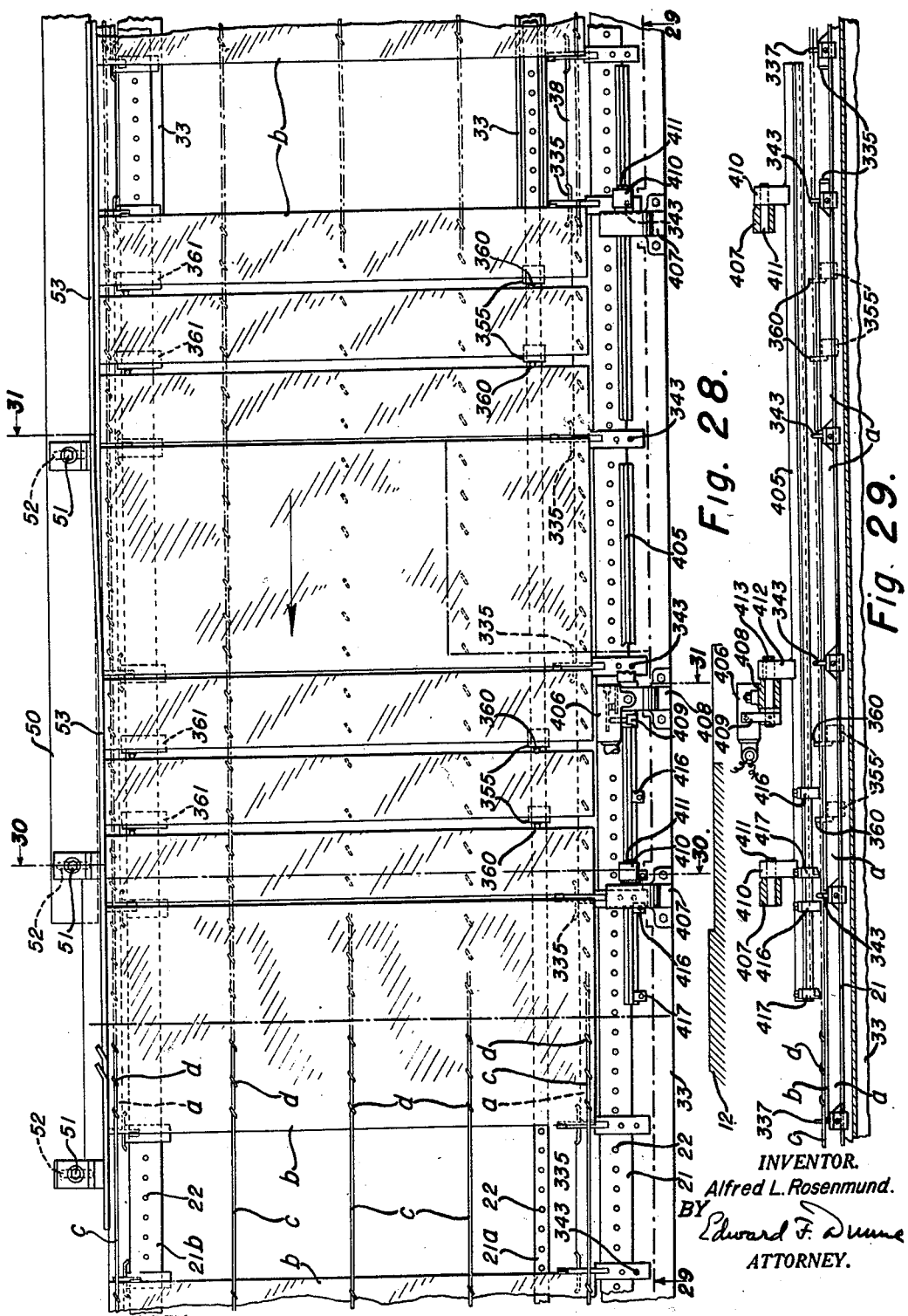

INVENTOR.
Alfred L. Rosenmund.
BY Edward F. Dunne
ATTORNEY.

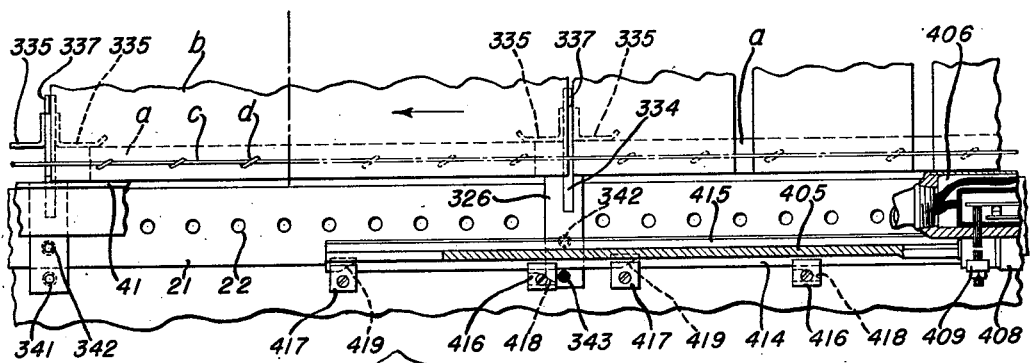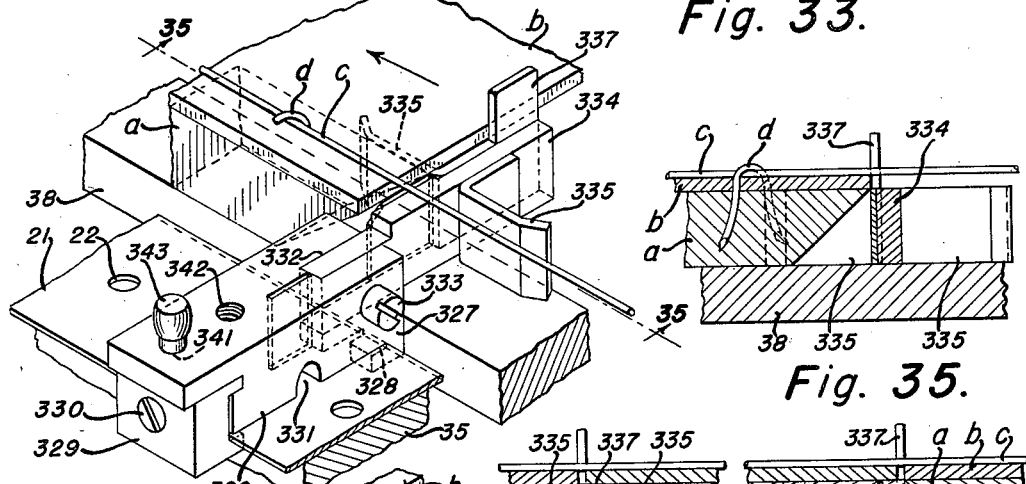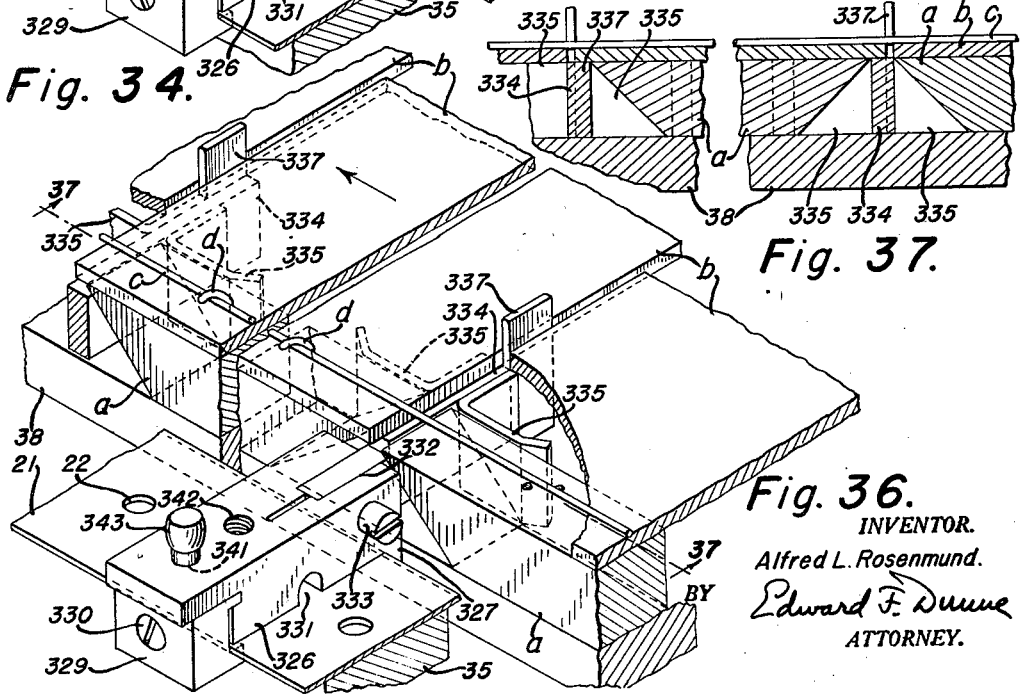

Dec. 8, 1942.  A. L. ROSENMUND  2,304,510
BOX MAKING MACHINE
Filed Aug. 1, 1940  18 Sheets-Sheet 17
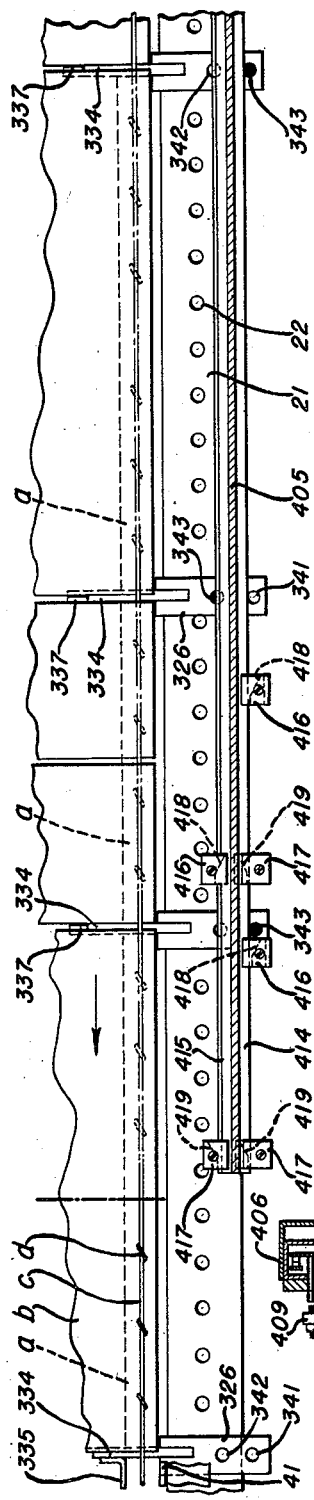
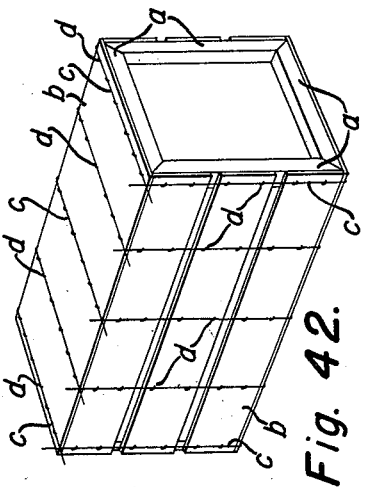
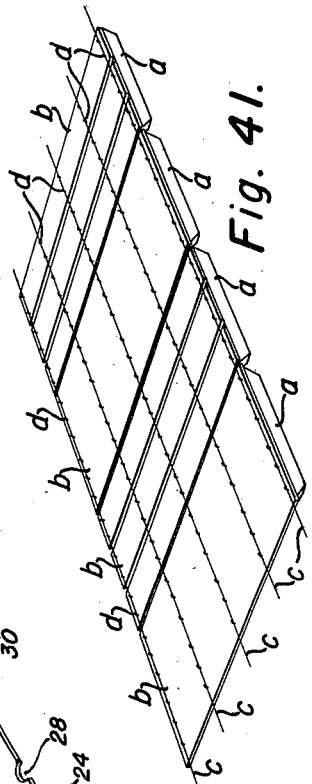
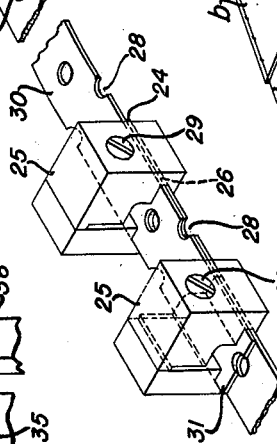
INVENTOR.
Alfred L. Rosenmund.
BY Edward F. Dunne
ATTORNEY.

Patented Dec. 8, 1942

2,304,510

UNITED STATES PATENT OFFICE 2,304,510

BOX-MAKING MACHINE

Alfred L. Rosenmund, Woodport, N. J., assignor to Stapling Machines Co., a corporation of Delaware Application August 1, 1940, Serial No. 349,100

61 Claims. (Cl. 1—14)

This invention relates to box or crate making machines and particularly to machines for stapling binding wire to box or crate parts to produce foldable box or crate blanks.

Among other objects, the invention is intended to provide an improved box or crate blank machine; a machine that is durable and dependable; a machine that may be economically manufactured and operated; a machine that is capable of producing an improved quality of boxes and crates from a minimum of materials; a machine capable of producing a more uniform product; and a machine that may be successfully operated at high speeds to produce efficient boxes and crates on a mass production basis.

Figure 1 is a general plan view, more or less diagrammatic, of the complete machine, with the intermediate portion of the conveyer and frame sections broken away.

Fig. 2 is a side elevation of the left side of the machine, on the same scale as that shown in Fig. 1.

Fig. 3 is an elevation of a portion of the rear left side of the machine, on an enlarged scale.

Fig. 4 is a vertical longitudinal sectional view, on an enlarged scale, taken on line 4—4 of Fig. 1, looking from the right side of the machine.

Fig. 5 is a horizontal sectional view taken on line 5—5 of Fig. 4, showing the rear left-hand portion of the machine.

Fig. 7 is a vertical transverse sectional view, on the same scale, taken on line 7—7 of Figs. 1, 3, and 6.

Fig. 8 is a vertical longitudinal section, on the same scale, taken on line 8—8 of Fig. 6.

Fig. 9 is a fragmentary vertical transverse sectional view, on an enlarged scale, taken on line 9—9 of Fig. 2, showing the stapler cams in inoperative position.

Fig. 10 is an enlarged fragmentary vertical sectional view, taken on line 10—10 of Fig. 7, showing the clutch brake in clutching position.

Fig. 11 is an enlarged sectional view showing a portion of the machine taken on line 11—11 of Figs. 6 and 12, showing the wire feed mechanism and an outside stapler in normal or inoperative position.

Fig. 12 is a horizontal sectional view taken on line 12—12 of Fig. 11.

Fig. 13 is a vertical sectional view, on the same scale, taken on line 13—13 of Fig. 12, with certain parts in section and other parts in dotted lines, showing an outside stapler and a co-acting outside clincher in operative position for the driving of a staple.

Fig. 14 is a vertical sectional view of the same, with the parts in a later operating position, showing a staple fully driven home.

Fig. 15 is a sectional view taken on line 15—15 of Fig. 13, with the parts in the same operative position.

Fig. 18 is an isometric view, on an enlarged scale, of an outside clincher in normal position.

Fig. 19 is a vertical sectional view, on line 19—19 of Fig. 18, showing an outside clincher in cooperative position with an outside stapler, the clincher supporting the cleat while the staple is being driven home.

Fig. 20 is a section on line 20—20 of Fig. 19.

Fig. 23 is an enlarged plan view of an inside clincher in normal or inoperative position.

Fig. 24 is a side elevation of the same.

Fig. 25 is a vertical central sectional view on line 25—25 of Fig. 24.

Fig. 26 is a vertical sectional view taken on line 26—26 of Fig. 24.

Fig. 27 is a view, partly in section, of the inside clincher and stapler in operative position, showing a staple driven and clinched.

Fig. 28 is an enlarged horizontal section taken substantially on line 28—28 of Fig. 2, with certain parts of the machine broken away, showing a box blank in the process of being stapled.

Fig. 29 is a vertical longitudinal view, on the same scale, taken on line 29—29 of Fig. 28, showing the pattern bar, tripper blocks and tripper pins mounted on cleat spacers to control the stapling operations.

Fig. 33 is a horizontal sectional plan view taken on line 33—33 of Fig. 32, showing the inclined tripper block surfaces in relation to the tripper pins mounted on the cleat spacers.

Fig. 34 is an enlarged isometric view of a trailing edge portion of a section of a box blank, showing a left spacer block properly positioning the end of a cleat and the edge of a side sheet flush with each other.

Fig. 35 is a section on line 35—35 of Fig. 34.

Fig. 36 is an isometric view of portions of adjacent sections of a box blank, with a cleat and sheet spacer properly relating the cleats and side sheets to provide a follow-up overlap of the side sheet edges when the box blank is folded into box form.

Fig. 37 is a sectional view taken on line 37—37 of Fig. 36.

Fig. 38 is a horizontal sectional view similar to and on the same scale as Fig. 33, showing the setting of the tripper blocks to control the location of the staples in a box blank when the sections are not all of the same dimensions.

Fig. 39 is a vertical section of a portion of the pattern bar assembly similar to that shown at the left in Fig. 31.

Fig. 40 is an isometric view of a portion of a conveyer band, showing the means to lengthen the band by inserting a piece of band between its ends.

Fig. 41 is a perspective view of a completed box blank.

Fig. 42 is a perspective view of a completed box made from the blank shown in Fig. 41.

Fig. 44 is an enlarged sectional view on line 44—44 of Fig. 2, showing the rack-and-pinion adjustment for the conveyer shaft at the front end of the machine.

Fig. 45 is a vertical sectional view taken on line 45—45 of Fig. 7, showing the stapler cams and associated parts in normal position.

Fig. 46 is a vertical section taken on line 46—46 of Fig. 9, showing the main clutch disengaged and the sheave pulley running free on the stationary shaft to cause the conveyer bands to continue in motion.

Fig. 47 is an enlarged vertical section on line 47—47 of Fig. 4, showing an overlapping joint of conveyer bands and connectors.

Fig. 48 is a plan view showing the conveyer band connectors secured in spaced relation at the joint of overlap.

Fig. 49 is an enlarged sectional view taken on line 49—49 of Fig. 7, showing the synchronizing cam-controlled switch.

Fig. 50 is a fragmentary sectional view taken on line 50—50 of Fig. 10, showing the clincher supporting bars and adjusting means therefor.

Fig. 51 is an enlarged sectional view showing in detail the stock presser bars.

Fig. 52 is an enlarged fragmentary portion of a box blank, showing an inside staple driven home and clinched.

Figure 6:
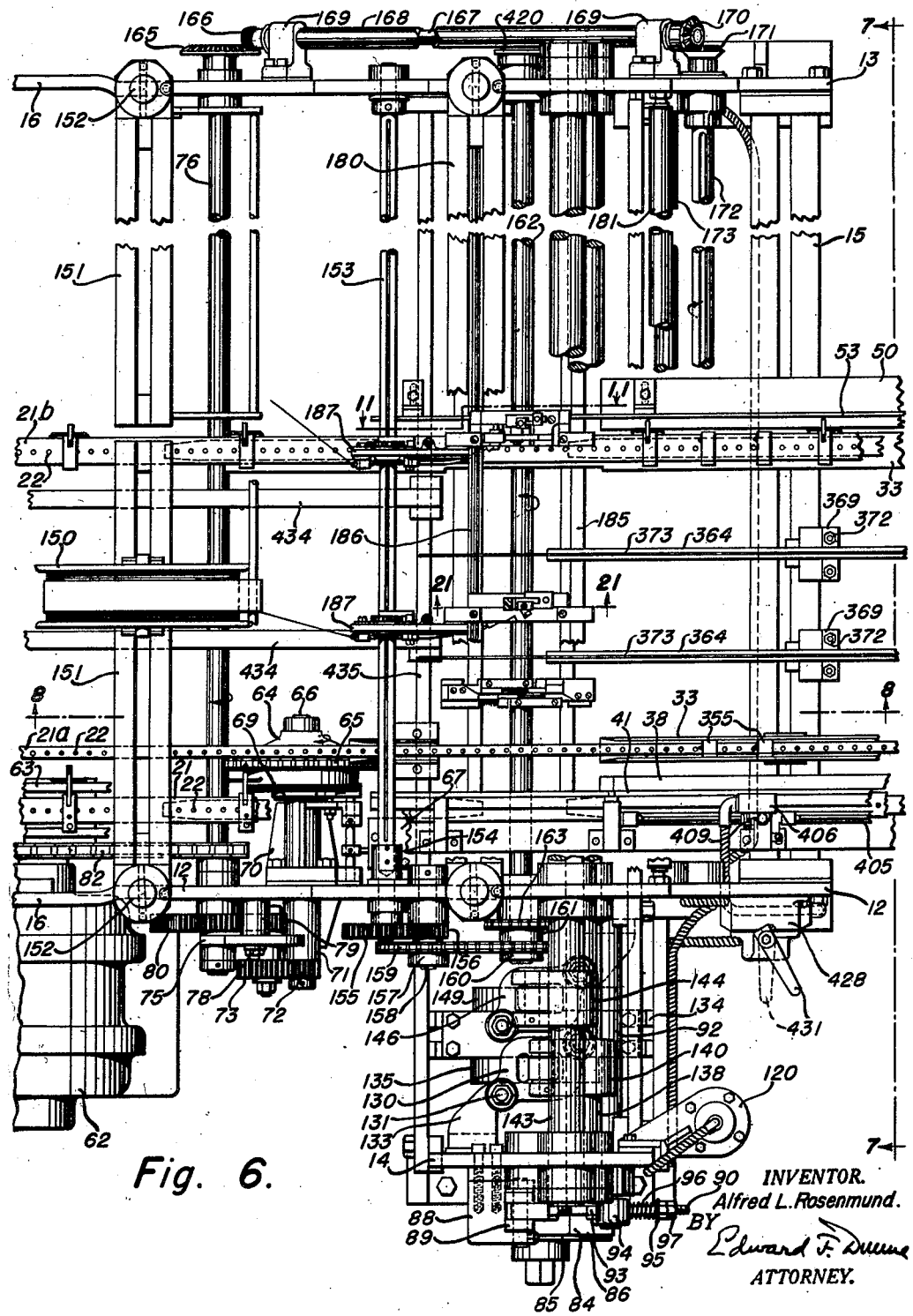
Fig. 6 is an enlarged plan view of a portion of the rear end of the machine as seen in Fig. 1, with certain parts omitted for clearness.

The illustrative machine is adapted to make box or crate blanks of various dimensions within wide limits.

A product of the machine is illustrated in Figs. 28 and 41 as a combination box and crate blank construction and in Fig. 42 as a blank folded into box form. As illustrated, the blank comprises four sections of cleats $a$ and side sheets $b$ connected together in foldable relationship by flexible binders (preferably wires) $c$ secured thereto by staples $d$ driven astride the outside binders $c$, through the side sheets $b$ and into the cleats $a$, and astride the intermediate binders $c$, through the side sheets $b$ and clinched on the under side of the side sheets $b$. The cleats $a$ are usually of resawed lumber, and the side sheets $b$ may be of rotary-cut veneer, resawed lumber, fiberboard or other suitable box material.

The machine comprises, generally, staple forming and driving mechanisms which are actuated at selected intervals to form and drive staples over binding wires and into box parts, conveyers to feed the box parts beneath the stapling mechanisms, and means to support the box parts during a stapling operation and to clinch the staples that are driven through the box parts.

Referring to Figs. 1 and 2, the several elements of the machine are supported by frame members at either end of the machine suitably connected by cross-bars.

At the front or receiving end of the machine, i. e., the right-hand end of the machine in Figs. 1 and 2, upstanding frame members 1 are spaced apart and secured to each other by tie-rods 2 and a cross-beam 3. Extending between and supported by frame members 1 at each side of the machine is a longitudinal shaft 4 having mounted thereon a traversing block member 5. Block members 5 serve as bearings for a sprocket shaft 8 upon which circular idler sprocket wheels 9 are rotatably mounted. Wheels 9 are adjustably positioned on shaft 8 by collars 10. As shown in Fig. 44, the shafts 4 are provided in their under surface with rack teeth 6 to receive a gear 7 keyed to the idler sprocket wheel shaft 8 journaled in bearings on the traversing block members 5. Sprocket shaft 8 has permanently secured on its extreme ends adjusting wheels 11 which, when rotated, will cause the blocks 5 carrying the sprocket wheel shaft 8 to move forward or backward by the action of gear 7 on rack teeth 6. Blocks 5 may be locked in position by means of the clamping action of a handle 5a threaded on a bolt 5b inserted through a slot in each block 5.

The traversing mechanism just described permits a ready lengthening or shortening of the work conveyer bands for the purpose and in the manner hereinafter explained.

At the rear or delivery end of the machine, i. e., the left-hand end of the machine in Figs. 1 and 2, a left main frame 12 and a right main frame 13 are spaced apart laterally and connected by cross-beams 15. Secured to left main frame 12 and right main frame 13 and extending toward the rear or left are extensions 16 supported by upstanding members 17 which provide bearings for a transverse drive shaft 18 upon which is adjustably keyed drive sprocket wheels 19 to cooperate with the idler sprocket wheels 9 at the other end of the machine. Secured to and extending from left frame 12 is an auxiliary or outboard frame 14 to support certain mechanisms hereinafter described.

Conveyers

Heretofore, in wirebound box blank machines, link chains were used for conveying the box parts through the machine. Such link chains were of fabricated construction necessitating the use of considerable metal stock. When these numerous links were joined one to the other to form a complete conveying chain, two or more of which are required in a wirebound box blank machine, there was added to the machine a tremendous weight to be supported by the framework and propelled through the machine. Moreover, the use of link chain conveyers limited the adjustment of the length of a conveyer to the length of a link or a multiple of the length of a link. It is desirable that the space between the box blanks be uniform. This cannot be accomplished for certain sizes of boxes when link chain conveyers are used.

In the illustrative machine, the box part conveying mechanism comprises three flexible bands 21, 21a, and 21b, preferably of steel. It will be sufficient to describe one of these bands, since two of them are identical and the third differs only in its width, being somewhat narrower than the other two. Each band comprises a strong flexible steel band which is thin in cross section and light in weight to facilitate handling when being assembled on the machine and to reduce the weight carried by the framework and the energy needed to propel the work through the machine. As shown in Figs. 1 and 5, each conveyer band is provided throughout its entire length with holes 22 spaced equidistant from each other. Holes 22 cooperate with studs 20 outwardly projecting from the face or surface of the drive sprocket wheel 19, over which the band is trained. Studs 20 enter holes 22 and move the band upon rotation of drive sprocket wheel 19. The conveyer band is similarly trained over the face of an idler sprocket wheel 9 at the front end of the machine, which is also provided with studs 20. Idler sprocket wheel 9 need be provided with only a sufficient number of studs 20 to guide the band and prevent it from slipping off the wheel. With the conveyer band trained over a drive sprocket wheel 19 and over an idler sprocket wheel 9, the loose ends of the band (Figs. 4 and 48) are clamped together by one or more clamp blocks 25, with the leading end 23 overlapping the trailing end 24. Preferably, two clamp blocks 25 are used, one adjacent the leading end 23 of the band and the other adjacent the trailing end 24 of the band.

As shown in the enlarged sectional view (Fig. 47) a clamp block 25 comprises two separate portions held together by a clamp screw 29. On the inner surface of each portion (the surface adjacent the conveyer band edges) there is a slot 26 of sufficient depth and width to receive therein the double thickness of the overlap of the loose ends of the conveyer band. Also, each portion of the clamp block 25 has partially embedded therein a vertical pin 27, the exposed portion of which, when the clamp block 25 is placed in proper position adjacent the overlap, will cooperate with semi-circular recesses 28 conveniently located in the outer edges of the band near the extremity of each loose end. The clamp block is then locked in place by the tightening clamp screw 29, thus insuring that there will be no slippage in the overlapping joint and no loose ends projecting therefrom.

In order to secure maximum efficiency from the type of conveying mechanism described above, inserts 30 of various lengths are provided, one of which is illustrated in Fig. 40. As there shown, insert 30 is clamped to the loose ends of the original one-piece band in the manner described above, with the leading end 31 of the insert 30 overlapping the trailing end 24 of the original band, and the leading end 23 of the original band overlapping the trailing end 32 of the insert 30. Inserts 30 are of the same flexible material as the original band hereinbefore described. Regardless of the length of the individual box set-ups longitudinally on the conveyer bands, which may vary considerably due to different dimensions of boxes and crates, it is possible by using an insert 30 of the required length to obtain the correct length of the endless conveyer band to permit the desired blank lengths to be distributed equally around the conveyer band with the required predetermined tie-wire spaces between blanks.

Supporting members for conveyer bands

Figure 30:
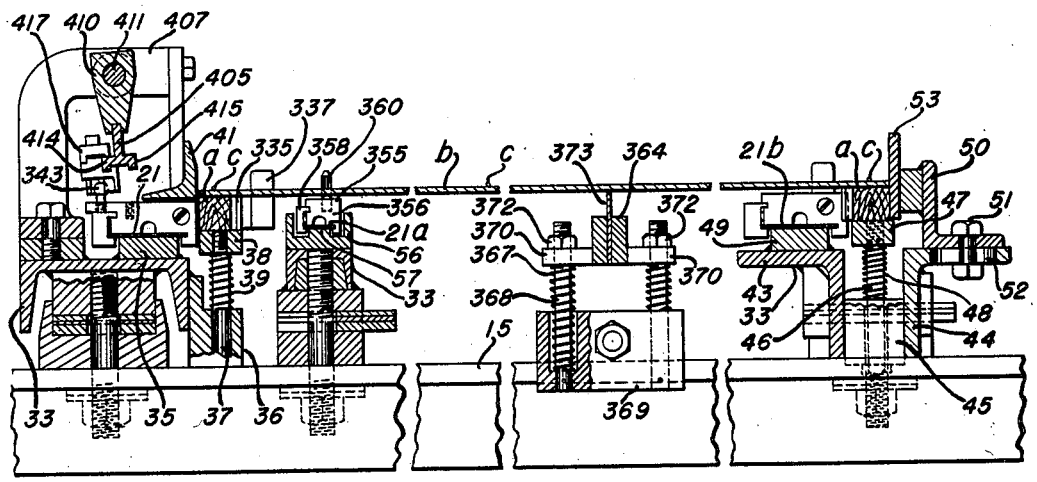
Fig. 30 is an enlarged vertical transverse section on line 30—30 of Fig. 28.
Figure 31:
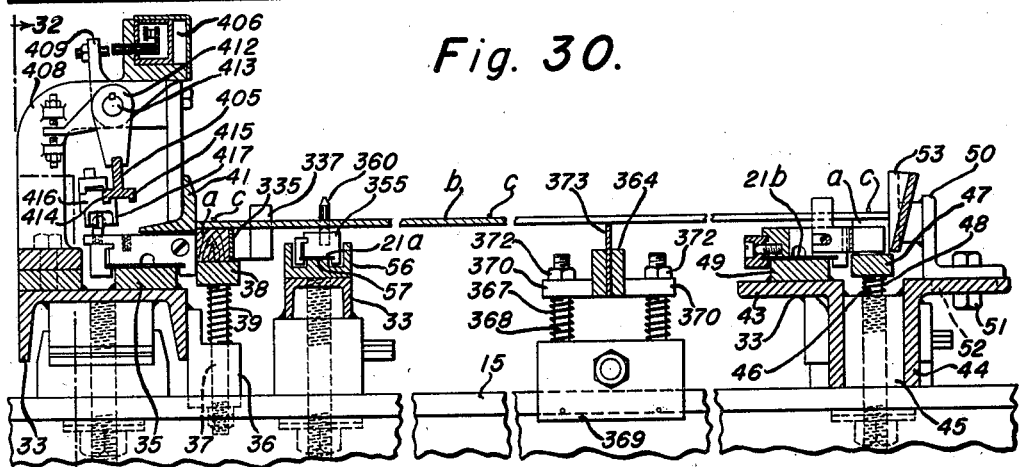
Fig. 31 is a similar vertical transverse sectional view taken on line 31—31 of Fig. 28, looking in the same direction.

Figs. 1, 7, 28, 30, and 31 and particularly Fig. 30 show the three endless conveyer bands described hereinbefore—a left conveyer band 21, an intermediate conveyer band 21a, and a right conveyer band 21b. Figs. 28 and 29 show spacer blocks secured to the conveyer bands to position cleats a and side sheets b in foldable relationship prior to being conveyed beneath the staple forming and driving mechanism. To support the three conveyer bands 21, 21a, and 21b in their travel from the front sprocket wheels 9 to the rear sprocket wheels 19, longitudinal supporting members 33 are provided, secured at their front ends to the cross-beam 3 and near their rear ends to the cross-beam 15.

The left supporting member 33 is in the form of an inverted channel. Secured to the upper surface of the member 33 is a member 35, rectangular in cross section, upon which the left conveyer band 21 travels. To the right side of the supporting member 33 as viewed in Fig. 30, means are provided for supporting the cleats a. At spaced intervals longitudinally of the right side of the member 33 and integral therewith are outwardly projecting members 36 having therein a bore to receive a downwardly projecting stud 37, to the top of which is secured integrally therewith a longitudinal member 38. Interposed between the outwardly projecting members 36 and the longitudinal member 38 is a spring 39 coiled about the stud 37. Also secured at spaced intervals to the top surface of the supporting member 33 are overhanging members 40 (Fig. 7) which bridge the left conveyer band 21 and the spacer blocks mounted thereon and extend toward the right-hand side of the supporting member 33. Secured to the overhanging members 40 is a longitudinal bar 41 which is located above and substantially adjacent to the longitudinal member 38. The longitudinal member 38 and the longitudinal bar 41 parallel each other and the left conveyer band 21 so that, with the cleats a resting on the longitudinal member 38 and with the side sheet b resting on the cleats a, the two box elements a and b will be properly positioned and guided at the left side by the longitudinal bar 41.

The right supporting member 33 for the right conveyer band 21b is slidably secured to cross-beams 3 and 15, permitting it to be moved from and toward the left supporting member 33, just described, which remains in a fixed position. The right longitudinal member is a fabricated structure comprising two oppositely disposed angle members 43 and 44, each having one leg placed in a horizontal position and the other leg projecting downwardly. Interposed at intervals between the members 43 and 44 and permanently secured thereto are spacing members 45. Spacing members 45 have formed therein a bore to receive a downwardly projecting stud 46, to the top of which is secured a bar 47. Interposed between the spacing members 45 and the bar 47 and coiled about the stud 46 is a spring 48 providing a yielding support for the cleats a similar to the one described hereinbefore for the left cleats a. To the horizontal surface of angle member 43 there is permanently secured a rectangular-shaped bar 49, upon which the right conveyer band 21b travels from the front end of the machine to the rear end of the machine. To the upper horizontal surface of the angle member 44 there are adjustably secured at intervals angle members 50. Angle members 50 are oppositely disposed from angle member 44 and are adjustably mounted thereon so that they may be moved from and toward the cleats a and locked to angle member 44 by means of clamp bolts 51 located in elongated slots 52 formed at intervals in angle member 44 (Fig. 28). Secured to the inner or left side of the upstanding legs of angle members 50 is a guide member 53 which, as shown in Fig. 7, extends upwardly at a slight angle to the vertical to facilitate the placing of the box parts on the conveyer bands. The adjustable supporting and guiding members just described are adapted to accommodate cleats a of various dimensions.

The intermediate supporting member 33 is also a fabricated structure adjustably secured on cross-beams 3 and 15. It takes the form of an inverted channel, to the top surface of which is permanently secured an oppositely-disposed channel-shaped member 56. Carried within the member 56 is a raised portion of sufficient width to provide a guide support 57 for the intermediate conveyer band 21a and its spacer blocks presently to be described. The purpose of the intermediate conveyer band 21a is to provide a conveyer band substantially adjacent the left conveyer band 21, to which can be adjustably secured a type of sheet spacer block used when producing crate blanks of slatted construction or blanks of partially slatted construction, such as are illustrated in Figs. 28 and 41.

*Mechanism for moving conveyer bands*

As best shown in Figs. 3, 4, 5, 6, and 9, to communicate power to drive the shaft 18 and sprocket wheels 19 adjustably keyed thereon, so as to impart continuous movement to the conveyer bands 21, 21a, and 21b by the cooperating action of the projecting pins 20 of the sprocket wheels 19 and the conveyer band holes 22, as hereinbefore described, there is provided a sprocket 61 keyed to the hub of a main drive sheave 60 rotatably mounted on a main shaft 59 which is caused to be continuously rotated clockwise (see Fig. 4) by an energizing motor 62 and the connection of sheave belts 63 thereto. As shown in Figs. 4, 5, and 6, the sprocket 61 imparts a continuous clockwise rotation to a sprocket 64 by a chain 65. Sprocket 64, which is loosely mounted on a shaft 66 journaled in bracket members 70 and 71, houses a clutching mechanism substantially of the type disclosed in U. S. Patent No. 2,130,486 to Florcyk, which issued September 20, 1938. The clutching mechanism includes a clutch brake 69 connected by appropriate linkage, hereinafter described, to a solenoid 67 fastened to a cross-bar 435 secured to the left and right main frames 12 and 13.

The energizing of the conveyer clutch solenoid 67 will release the clutch brake 69 to permit it to clutch the sprocket 64 to the shaft 66. To impart a braking action to declutch the sprocket 64 from the clutch members secured on the shaft 66, the conveyer clutch solenoid 67 is de-energized, permitting a brake spring 68, which is fastened to the linkage of the solenoid 67 and anchored to a bracket (Fig. 4) secured to the left main frame 12, to operate the linkage and apply the clutch control brake 69.

Fast to the opposite end of shaft 66 is a drive gear 72, clearly shown in Figs. 3, 5, and 6, which drives a change gear 73 keyed to a short shaft 74 journaled in an adjustable arm 75 loosely mounted on a shaft 76. As shown in Fig. 3, within the uppermost portion of the arm 75 there is an elongated slot 77 and, projecting therethrough, a suitable clamp bolt 78 to provide a locking means when the change gear 73 is properly positioned to cooperate with drive gear 72. This adjustable arm 75 provides a compensating arrangement for different diameters of change gears 73 which are used to produce various speeds of the conveyer bands 21, 21a, and 21b to vary the relationship between the speed of the conveyers and the speed of operation of the staplers so that the uniform distance between adjacent staples in a series can be varied as desired. Drive shaft 18 is driven through a gear 79 fast on short shaft 74 which drives a gear 80 fast on shaft 76. Shaft 76 carries a drive sprocket 81 connected by a drive chain 82 to a sprocket 83 fast on conveyer drive shaft 18. Through the drive connections described, rotation of shaft 66 causes rotation of drive shaft 18 and sprocket wheels 19 keyed thereto to propel conveyer bands 21, 21a, and 21b through the machine.

*Main brake mechanism*

Figures 53, 55:
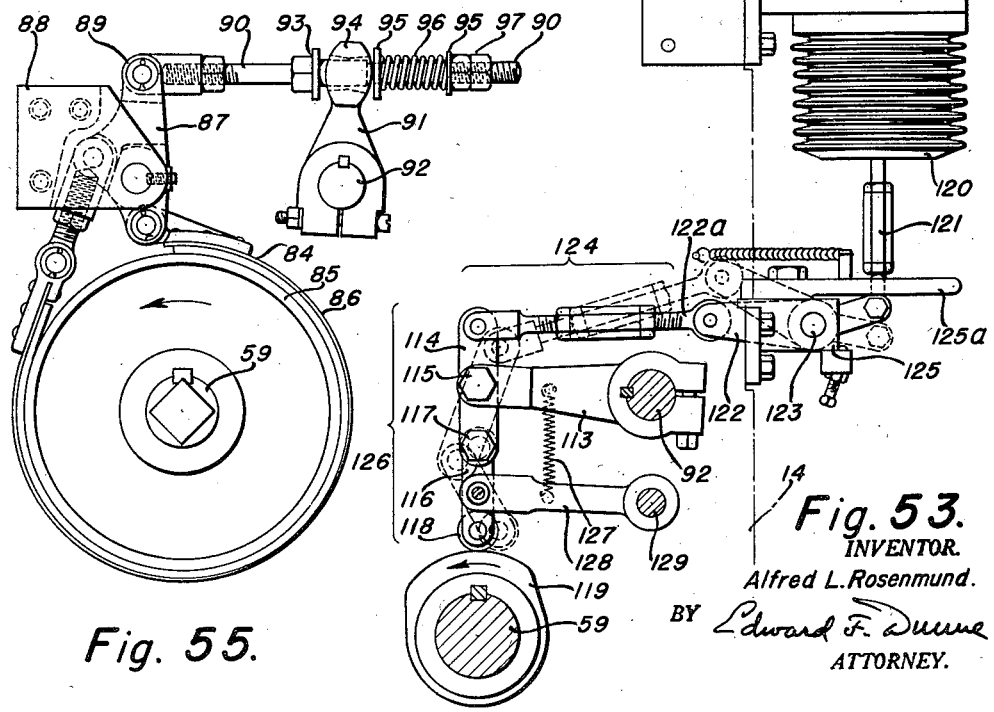
Fig. 53 is an enlarged side elevation of the main clutch and brake control mechanism viewed from the left-hand side of the machine with the outboard frame removed.
Fig. 55 is an elevation, on an enlarged scale, showing the main brake mechanism viewed from the left side of the machine, as indicated by line 55—55 of Fig. 7.

As best shown in Figs. 3, 5, 6, 7, and 9, the main shaft 59 journalled in bearings in the left main frame 12 and in outboard frame 14 has rotatably mounted thereon at its right-hand end and substantially adjacent the inside surface of left main frame 12 the drive sheave 60 (Figs. 7 and 9). The energizing of motor 62 will cause the drive sheave 60 to be rotated freely by the sheave belts 63 connected thereto. To the opposite end of main shaft 59 (Fig. 55) substantially adjacent the outside surface of the outboard frame 14 there is keyed a main brake mechanism 84 comprising a brake drum 85 and a brake band 86, the ends of which are secured at separated points to a bellcrank 87 which is pivotally mounted within a bracket 88 secured to the outer surface of the outboard frame 14. To the uppermost ear 89 of the bellcrank 87 there is pivotally connected a rod 90 extending longitudinally toward the right (Fig. 3) through a bore in the upper portion 94 of a rock lever 91 keyed to a rock shaft 92. The rod 90 carries an adjusting means by which the upper portion 94 of the rock lever 91 is interposed between a washer and nut 93 on one side and a pair of washers 95 on the other side. Between the washers 95 is a spring coiled about the rod 90. Adjacent the outermost washer 95 there is provided a pair of lock nuts 97 by which adjustments are made controlling the braking action of brake band 86. The illustrations in Figs. 3 and 55 show the brake band 86 applied on brake drum 85. To release brake band 86, a counter-clockwise rocking of rock lever 91 will impart a similar movement to bellcrank 87 to loosen the brake band from brake drum 85.

*Main clutch and clutch brake mechanism*

As shown in Figs. 7, 9, and 46, there is housed in main drive sheave 60 a clutching mechanism, substantially of the type disclosed in U. S. Patent No. 2,130,486, which serves the purpose of clutching or declutching main shaft 59 and main drive sheave 60. The operation of said clutch mechanism is controlled by the action of clutch brake mechanism 98 (Fig. 10) operating on brake drum 112 which is integral with a collar portion 401 of the main clutch. Brake mechanism 98 is relatively timed to apply its braking action just an instant prior to the brake-applying action of the main brake 84, both braking mechanisms being controlled by rock shaft 92. As shown in Figs. 10 and 46, to the end of rock shaft 92 and adjacent the inside surface of left main frame 12 there is adjustably secured a lever 99, one projecting portion of which serves as a stop 100 designed to contact an adjustable stop pin 101 contained in a bore of bracket 102. The other projecting portion of lever 99 has pivotally connected thereto a rod 103 projecting angularly downward through a bore in the upper portion of a projection 104 of a bellcrank 105. To impart a rocking motion to bellcrank 105, rod 103 has fastened thereon, adjacent one side of the upper portion of the projection 104, a washer 106. A washer 107 is held yieldingly against the opposite side of projection 104 by a spring 108 coiled about rod 103 and interposed between said washer 107 and a washer which is slidable on rod 103 and supported by adjusting nut 109. The bellcrank 105, pivotally mounted on a stud 110, has two ears projecting therefrom, to which are pivotally secured the ends of a brake band 111. With the bellcrank in the position shown in Figs. 10 and 46, the brake band 111 will be tightened about the brake drum 112, thereby declutching the main shaft 59 from the main drive sheave 60. To release brake band 111, rock-shaft 92 is rocked clockwise (Figs. 10 and 46) a sufficient amount permitted by stop 100 and stop pin 101, to impart a counter-clockwise rocking movement to bellcrank 105 by rod 103, thus loosening the brake band 111 from brake drum 112, which will permit the clutch mechanism to function by clutching the main drive sheave 60 internally, thereby communicating driving power to the main shaft 59.

*Main clutch solenoid mechanism*

Both the main brake and the clutch brake mechanisms hereinbefore described are operated by the rocking motion imparted to rock-shaft 92 by a lever 113 keyed thereon (Fig. 53) which receives its movement through a pivotal connection to a link 114 at 115. The link 114 is loosely connected to a link 116, thereby providing a collapsible joint 117. A roller 118 rotatably mounted in the lower end of link 116 is designed to contact and follow the contour of the work face of a cam 119 keyed to main shaft 59 adjacent the inner surface of outboard frame 14 (see Figs. 7 and 9) only when the links 114 and 116 assume a vertical or non-collapsible position, as shown in full lines in Fig. 53. The linkage just described constitutes a vertical toggle designated generally 126 in Fig. 53. The collapsing and straightening of the vertical toggle 126 is controlled by energizing and de-energizing a solenoid 120 carried by outboard frame 14, as hereinafter described. Solenoid 120 is connected by an adjustable member 121 to a horizontal toggle 124 consisting of a rock lever 122 loosely mounted on a stud 123 on a bracket 125 and a link 122a pivotally connected at one end to the rock lever 122 and at the other end to link 114. The arrangement is such that when solenoid 120 is energized, the toggles will be straightened and when solenoid 120 is de-energized the toggles will collapse.

*Mechanism to impart motion to the staple formers and drivers*

The staple formers and drivers hereinafter described are operated by rock-shafts 138 and 143 carried by frame members 12, 13, and 14 (Fig. 7). Rock shaft 138 operates the staple formers and rock shaft 143 operates the staple drivers. Rock shaft 138 is rocked by a vertically reciprocating pitman 139 pivotally connected at its upper end to a lever 140 keyed to shaft 138 and at its lower end to a vertically movable framework comprising an upper horizontal member 130, a lower horizontal member 130a, an intermediate horizontal member 130b, and two vertical rods 131 (Figs. 7, 9, and 45). The rods 131 are secured to and rigidly connect upper and lower members 130 and 130a and pass through bores provided in intermediate member 130b. The framework or carriage just described is reciprocated vertically in bearings appropriately formed in brackets 133 and 134 to receive the rods 131 by a cam 135 keyed to shaft 59 and contacting rollers 136 carried by members 130a and 130b. Rollers 136 are held in contact with cam 135 by coil springs 137 surrounding rods 131 between members 130 and 130b. Rotation of shaft 59 and cam 135 causes vertical reciprocation of the carriage to which the pitman 139 is connected, and reciprocation of pitman 139 rocks shaft 138 through the lever 140 to operate the staple formers.

A similar construction is provided to impart a rocking motion to the shaft 143 which operates the staple drivers. Keyed to shaft 143 is a lever 144 connected by a pitman 145 to the upper member 146 of a framework or carriage similar to that described for the staple former drive, which is caused to reciprocate vertically by a cam 149 on shaft 59 (Figs. 7 and 9).

The staple former drive cam 135 and the staple driver drive cam 149 are relatively located on main shaft 59 so that through their respective trains of connections the mechanisms contained within the staple forming and driving units will first be actuated to cut the staple wire and form the staple and then drive the formed staple into the work.

*Staple stock wire support and feed*

As illustrated in Figs. 1, 2, and 3, the staple-stock wire is carried by a series of reels 150 adjustably mounted on swinging arms 151 to permit the reels 150 to be swung from their operating position, as shown in full lines in Figs. 1 and 2, to the position shown in broken lines, for replacement of empty reels 150. Two such arms are provided, each being loosely mounted on upstanding studs 152 permanently secured to the left and right main frames 12 and 13 respectively. The staple-stock wire carried by the reels 150 is fed into the staple forming and driving units by feed rollers, hereinafter described, which are rotated by a wire feed shaft 153. As shown in Figs. 3, 6, and 7, the wire feed shaft 153 is demountably secured in a socket of a short shaft 154 which shoulders against the inner surface of the left main frame 12, thus facilitating the exchanging of the elements adjustably keyed thereon. To impart a positive continuous motion thereto, the short shaft 154, rotatably mounted in left main frame 12 carries, keyed thereon, a gear 155 intermeshing with a pinion 156 positioned adjacent to a sprocket 157, both of which are keyed on a short shaft 158 rotatably mounted in left main frame 12. Sprocket 157 is driven by a chain connection 159 with a sprocket 160 adjacent a sprocket 161, both being keyed on a clincher shaft 162 which has a rotating motion imparted thereto by a chain connection 163 from a drive sprocket 164 keyed on main shaft 59.

Thus it will be seen that the wire feed shaft 153 will be rotated to feed staple stock wire to the staple forming and driving mechanisms presently to be described. Because the staple forming and driving mechanisms are also operated by rotation of shaft 59, the feeding of the wire is correlated with the operations of the staple forming and driving mechanisms.

Binding wire support and feed

Heretofore, in wirebound box blank machines the binding wire c was pulled from the stock reels by reason of its attachment by staples to the work being operated upon. This method of feeding the binding wire placed an undue strain on the conveyer mechanism and the stapled box parts. The drag or back pull of the binding wire increased the power required to operate the machine and frequently loosened or pulled out the previously driven staples.

The illustrative machine is provided with mechanism for automatically feeding the binding wire c to reduce the power required to operate the machine and to improve the product by reducing the loosening or pulling of the staples from the box parts.

Referring to Figs. 6, 7, and 8, the shaft 76, which rotates continuously when sprocket 64 is clutched to shaft 66, as hereinbefore described, has keyed thereon adjacent the outer surface of the right main frame 13 a bevel gear 165 communicating power to a feed shaft 172 by intermeshing with a bevel gear 166 fast on a shaft 167 housed within a steel tube 168 and journaled in bearings in brackets 169 diagonally disposed and secured to the outer surface of the right main frame 13. The other end of shaft 167 has secured thereon a bevel gear 170 intermeshing with a bevel gear 171 secured to feed shaft 172 adjacent the outer surface of the right main frame 13 (Fig. 6 and 7). Above and to the left of feed shaft 172 (Fig. 6) is a stationary shaft 173 with its ends secured in left and right main frames 12 and 13. Slidably keyed on feed shaft 172 are V-grooved feed rollers 174 retained between forked legs 175 which prevent any lateral movement of the V-grooved rollers 174 (Figs. 7 and 8). The forked legs 175 are integrally assembled by means of a hardened wire guide 176 permanently secured thereto and are adjustably secured on stationary shaft 173 by means of a set screw 177 in the hub of one forked leg 175 (Fig. 7). Forked legs 175 extend downwardly a sufficient distance to contact the hubs of the V-grooved feed rollers 174, thereby cooperating with the set screw 177 to prevent any rocking motion. Retained between the forked legs 175 and idly mounted to rotate on stationary shaft 173 are V-grooved rollers 178 designed to co-act with the V-grooved feed rollers 174.

The supply of binding wire c is carried on reels 179 mounted on swinging arms 180 similar to those hereinbefore described for the staple-stock wire reels. The arms 180, with the supply reels 179 mounted thereon, are secured to the uppermost portions of the left and right main frames 12 and 13. The binding wire c is led from a reel 179 and over a freely rotating roller shaft 181 (Fig. 8) rotatably mounted at either end in bearings 182 secured respectively to the left and right main frames 12 and 13 (Fig. 7). After passing over roller shaft 181 (Fig. 8) the binding wire c passes through a wire guide 176 under the V-grooves of a loosely-mounted roller 178 and over the V-grooves of a keyed feed roller 174. The relative location of the rollers 178 and 174 is such that the binding wire assumes substantially an S formation in its passage over said rollers. From roller 174 the binding wire passes under a guide roller 248 carried in the lower end of a stapler body and is positioned thereby for a stapling operation. The S formation of the wire in its passage over the rollers 178 and 174 permits the wire to slip on drive roller 174 when the coils of the S formation are loose and to be frictionally engaged and fed by said roller when the coils of the S formation are tightened. To provide a feed of the wire at a speed substantially equal to the speed of travel of the conveyer bands 21, 21a, and 21b, the drive roller 174 has a peripheral speed slightly in excess of the speed of the conveyer bands. With the binding wire attached to the box parts, movement of the conveyer bands 21, 21a and 21b will pull the binding wire and tend to tighten it over the feed rollers. This tightening of the wire about the rollers will cause the rollers to feed the wire faster than the conveyer bands are traveling until the pull on the wire is reduced. The coil about the rollers will then loosen and slip to prevent a too rapid feed of the wire. The arrangement is such that the feed of the wire is automatically controlled to supply the wire as needed and to relieve the conveying mechanism and box parts of undue strain.

Forming and driving units

Heretofore, in wirebound box blank machines in which the work conveyers move continuously and the stapling mechanism operates on the moving work, the several stapler units were mounted on a movable carriage which was moved with the work during a staple driving operation and then returned to initial position. Such a carriage with the several stapler units mounted thereon was heavy and required considerable power to reciprocate it over the work. The present invention eliminates the movable carriage for the stapler units and provides stapler units which are light in weight, compact in form, and so constructed that the stapler unit as a whole need not move with the work during a staple driving operation. This is accomplished by mounting the staple former and the staple driver to swing with the work and then return to initial position, as hereinafter described. Such an arrangement reduces the weight and initial cost of the machine and the expense of operating it.

A wirebound box blank machine is equipped with as many staple forming and driving units or staplers as there are binding wires to be stapled. The two outside units form and drive relatively long staples over a binding wire, through the side material and into the cleats. The intermediate or inside units form and drive relatively short staples over a binding wire and through the side material.

The several stapling units are supported by crossbars 185 and 186 fixed to the inside of main frames 12 and 13, as shown in Figs. 7, 11, and 13, and are adjustably secured to said cross-bars by clamp screws 193.

An outside stapling unit is shown in Figs. 13, 14, and 15. The operating parts, suitably housed and guided, comprise generally a fixed cutter 214, a movable cutter 215, a loop bar 232, a staple former 216, and a staple driver 236. As hereinafter explained in more detail, the staple former 216 and the staple driver 236 are each pivotally connected to their actuators to permit the staple former and the staple driver to swing about their pivot points and move with the work during a staple driving operation while the stapler unit housing and the cross-bars to which it is secured remain stationary.

Figure 16:
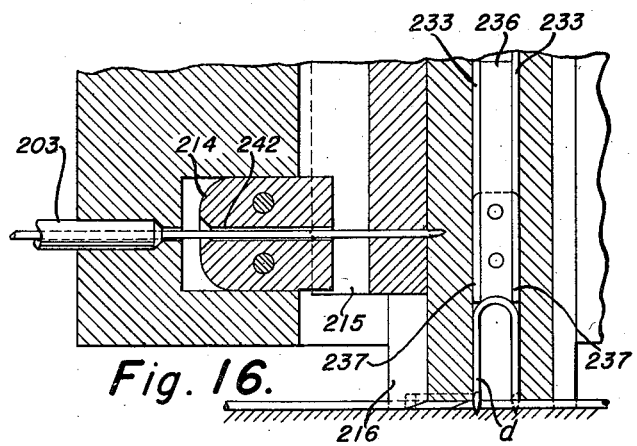
Fig. 16 is a diagonal vertical section of a portion of an outside stapler taken on line 16—16 of Fig. 15, with the parts in the same operative position.

Fixed cutter 214, which is adjustably secured in a recess in the lower part of the housing (Figs. 15 and 16), has a chamfer end suitably angled to form a beveled staple point. Movable cutter 215 has a corner vertically chamfered to correspond with the chamfer end of fixed cutter 214 so that the staple stock wire will be severed at a proper angle between the two cutters when the movable cutter is moved past the fixed cutter in the manner hereinafter described. When a piece of staple stock wire has been severed by the cutters it lies directly over the loop bar 232 and beneath staple former 216 which descends and bends the piece of wire over the loop bar to form a staple.

As shown in Figs. 11 and 13, staple former 216 is pivotally connected by a pin 217 to a member 218 slidably mounted on a rod 219 secured to the housing. The member 218 is pivotally connected by a turnbuckle 220 to a rocker arm 221 adjustably keyed to rocker shaft 138, shown in broken lines in Fig. 13. Rocking of shaft 138 in a counter-clockwise direction (Fig. 13), as hereinbefore described, causes a downward movement of the member 218 and the staple former 216, and rocking of shaft 138 in a clockwise direction causes an upward movement of the member 218 and the staple former 216 to return them to initial position.

The reciprocating movement of member 218 also causes a reciprocating movement of the movable cutter 215, which is pivotally connected to a pin 222 loosely mounted in a block 223 adapted to oscillate in a slot 224 in a lever 225. Lever 225 is pivotally connected at one end by the pin 217 to the slidable member 218 and at the other end is pivotally connected to the stapler housing by a link 226 pivoted at 227 to the housing and loosely mounted on an eccentric stud 229 adjustably secured in lever 225 by the clamping action of a screw 230 and a slot 231. The eccentric stud 229 provides for an adjustment in the timing of the cutting operation relative to the staple forming operation, which immediately follows.

When the wire has been cut, the descending staple former 216 engages the severed piece of wire in a horizontal V-groove formed in the lower end of the staple former and bends the piece of wire over the loop bar 232, the legs of the formed staple entering opposed vertical grooves 233 formed in a recess in the staple former 216. Said vertical grooves have a depth corresponding to the diameter of the staple wire and communicate with the horizontal V-groove. After the staple has been formed (see Figs. 13, 15, and 16) the loop bar 232, which is pivotally mounted on a pin 234 carried by the staple housing, is swung out of operative position by the action of a cam surface 235 on driver 236 to permit the driver 236 to descend and drive the staple out of the staple former and into the work.

The driver 236, as shown in Figs. 12 and 15, is T-shaped and rides in T-shaped grooves formed in the staple former. The driver 236 is provided near its lower end with fins 237 which project into the opposed longitudinal grooves 233 in the staple former 216 and assist in guiding the movement of the staple driver within the staple former.

Driver 236 is operated by a rocker arm 239 adjustably keyed on rocker shaft 143 through a turnbuckle 240 pivotally connected at one end to the arm 239 and at the other end to the upper end of driver 236.

Referring to Fig. 11, the movable cutter 215, the staple former 216 and the staple driver 236 are shown in their normal or initial position prior to a staple forming and driving operation and, in broken lines, with the staple-stock wire fed sufficiently to form a staple $d$ therefrom. The counter-clockwise movement of the rock shaft 138 (viewed from the left side of the machine) imparts a downward rocking movement to the rock lever 221 keyed thereon; and by appropriate linkage, as described hereinbefore, the staple former 216 and also the lever 225 will be moved downward due to their relative pivotal connection on pin 217, thereby causing the movable cutter 215 to be thrust downward a sufficient distance to shear off the staple-stock wire projecting beyond the fixed cutter 214. As stated hereinbefore, there is a continuous feeding of staple-stock wire during a complete stapling operation, and by reference to Figs. 15 and 16 it will be noted that after the shearing operation the incoming staple-stock wire is deflected by a bevel 241 on movable cutter 215 and freely permitted by a horizontal U-shaped slot 242 of fixed cutter 214 to be guided between the driver 236 and the loop bar 232 while staple $d$ is being driven. When the driver 236 returns to its initial position (Fig. 11) a correct length of staple-stock wire will have been fed therein beyond the fixed cutter 214 and, due to the flexing of the wire and the return movement of the loop bar 232, will move into proper position for formation of the succeeding staple.

Figure 17:
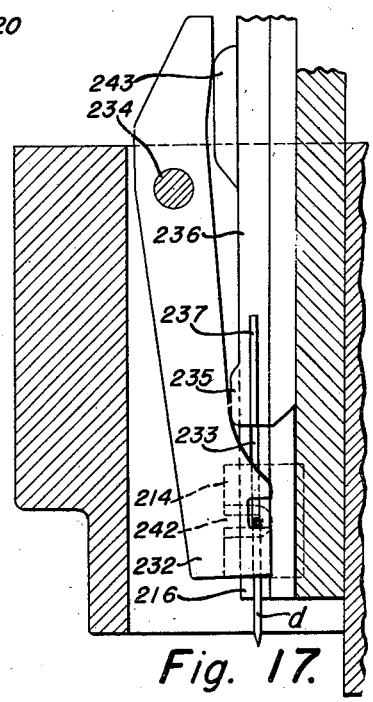
Fig. 17 is a diagonal vertical section on line 17—17 of Fig. 15, with the parts in operative position, showing the staple completely formed over the loop bar.

To positively and firmly hold the loop bar 232 in its functioning position, as shown in Fig. 17, the upper portion thereof is contacted by a cam surface 243 on driver 236; and with continued downward movement of the former 216 the V-groove in the lower end thereof will correctly position the severed staple wire on the loop bar 232 and the wire will be bent thereabout by the opposed longitudinal grooves 233 to form a staple $d$.

Relatively timed with the counter-clockwise movement of the rock shaft 138 (viewed from the left side of the machine) is the counter-clockwise movement of the rock shaft 143 to impart a downward movement to the driver 236 by means of its connection to rocker arm 239 keyed on rock shaft 143. In the relative downward movement of the staple former 216 and the staple driver 236 the cam surface 235 thereon contacts a cooperating cam surface on loop bar 232, causing it to swing on pin 234 and thus to be removed from the path of the descending driver 236. As the former 216 and the driver 236 move downward, the former 216 contacts the side sheet b, thereby providing a guide and support for the staple d since the driver 236 follows instantly thereafter to drive the staple d out of the former 216, astride the binding wire c, and into the box element a and b.

As best shown in Figs. 13 and 14 and as hereinbefore stated, the machine of this invention is not provided with a horizontally reciprocating carriage to compensate for the continuous conveyer travel with the work thereon during a stapling operation. Instead, the staple former 216 and the staple driver 236 swing with the work, as hereinbefore described. Referring to Fig. 13, there is shown the staple former 216 contacting the side sheet b and the staple driver 236 driving the staple d therefrom with the points thereof entering the side sheet b, which is moving in the direction of the arrow. Contact of the staple former and the staple being driven, with the moving work will move the staple former 216 and the staple driver 236 with the work until the staple d is completely driven, as shown in Fig. 14. Then, by the clockwise movement of rock shafts 138 and 143, the staple former 216 and the staple driver 236 will be moved upward and into their initial positions by the cooperating action of a lobe 244 on staple former 216 contacting an upwardly-inclined bevel surface 245 on a stationary block 246 (Figs. 13 and 14). During the upward movement of the staple former and the staple driver, movable cutter 215 also rises by reason of its connection with movable member 218, and loop bar 232 is swung into operative position beneath the staple former by the action of the lobe or cam 243 on the upper part of the staple former acting on the upper end of the loop bar 232 (Fig. 17).

Figures 21, 22:
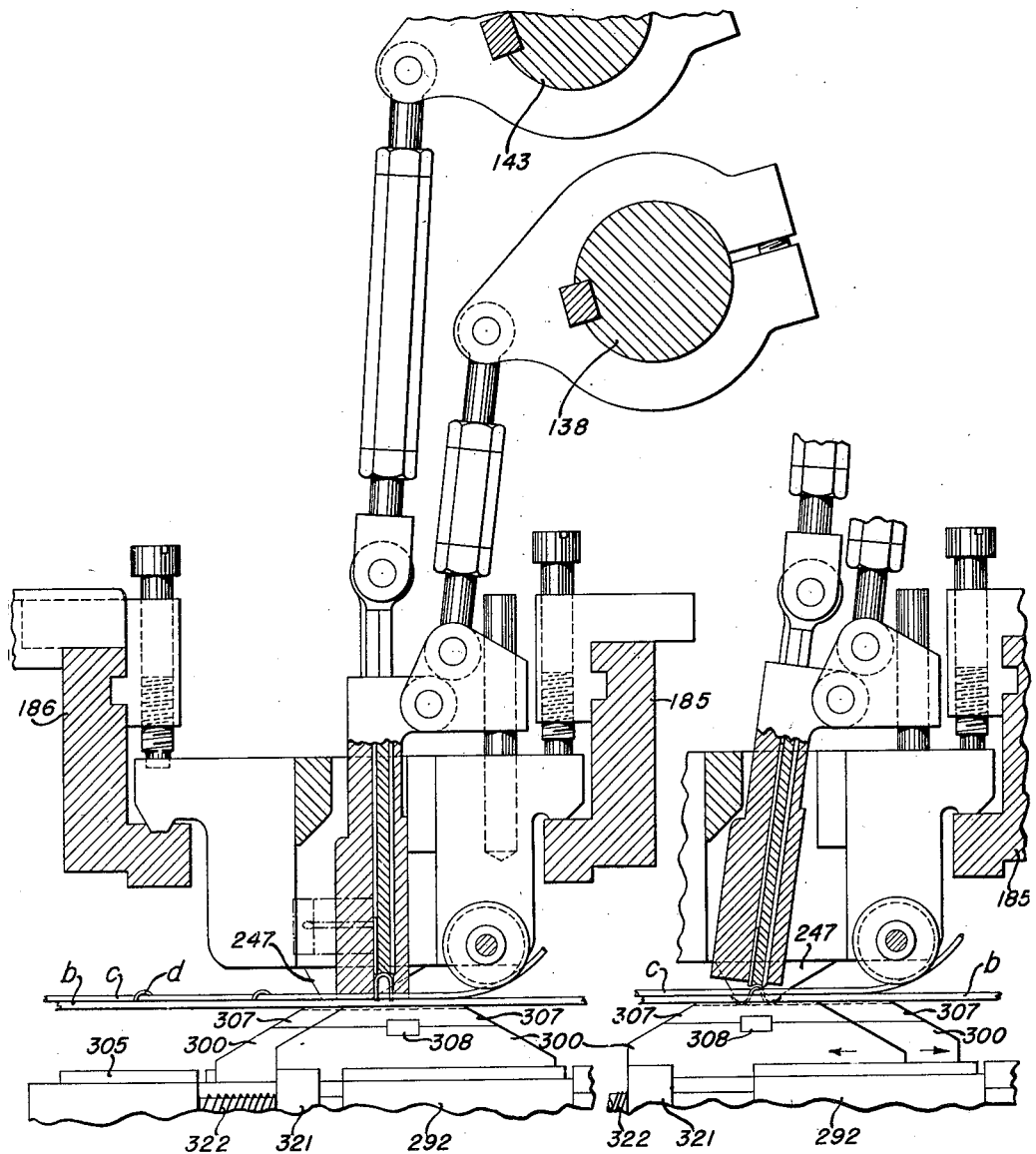
Fig. 21 is a vertical sectional view taken on line 21—21 of Fig. 6, on an enlarged scale, of an inside stapler, showing an inside clincher co-acting therewith at the start of a staple driving operation.
Fig. 22 is a vertical sectional view of the same, with the parts in a later operating position, showing an inside staple fully driven and clinched.

The intermediate or inside staple forming and driving units may be the same as the outside unit just described or, as shown in Figs. 21 and 22, the movable cutter may be formed as a part of the staple former 216. A separate movable cutter is preferable for the outside units because the staples formed by such units are longer than the staples formed by the inside units.

To cooperate with clinching units hereinafter described, each stapler has, projecting downwardly from the under surface of its housing, a lobe 247 (Fig. 11). The lobe 247 serves as a stop to position the side sheets b relative to the staple driver for a staple driving operation.

Staple stock wire feed

The staple stock wire, carried on reels 150, as hereinbefore described, is led through a hardened guide tube 197 secured in a clamp member 198 adjustable in a slot 199 formed in a bracket 187 adjustably secured to cross-bar 186. From the guide tube 197 the staple-stock wire passes between the knurled work faces of co-acting feed rollers 201 and 202 and into a second guide tube 203, one end of which is secured in an adjustable bracket 204 and the other end of which is inserted in a counterbore near the lower portion of the stapler housing (Fig. 11).

Referring to Fig. 11, which is an elevation of the right-hand side of an outside stapler unit, and also to Fig. 12, which is a top plan view thereof, partly in section, there is shown a drive gear 205 adjustably keyed on staple wire feed shaft 153 adjacent the right-hand side of bracket 187 and held against lateral movement by a forked member 206 secured to bracket 187 by screws 207. Drive gear 205 meshes with a cooperating gear 208 splined on a short shaft 209 rotatably mounted in bracket 187. Splined to the opposite end of short shaft 209 is the feed roller 201 which cooperates with the feed roller 202 rotatably mounted on an eccentric shaft 210 secured in the lower portion of the bracket 187.

The feed roller 202 is urged toward the feed roller 201 by a spring 211 connected to a rod 212 projecting from eccentric shaft 210 and to an adjustable rod 213 threaded in an outwardly projecting portion of bracket 187. As hereinbefore described, the staple-wire feed shaft 153 has a rotating motion imparted thereto, through appropriate drive connections with the main shaft 59 when it rotates, which occurs only when a stapling operation is performed. Thus, the staple-stock wire is fed continuously during a staple forming and driving operation. The amount of staple-stock wire fed is controlled by the diameters of the feed rollers 201 and 202 and is determined by the desired length of staple d.

Automatically adjustable work support for outside stapling operations

The outside stapler units drive staples d astride a binding wire c, through a side sheet b, and into a cleat a. It is desirable that all staples be driven uniformly into the work, i. e., the same distance into the work from the top surface thereof. Because the staple drivers have a constant drive stroke and because the surface level of the work may vary due to warping of the box materials or inaccuracies in dimensioning them, a support for the cleats and sheets being operated upon by an outside stapler is provided, such support being automatically adjusted by the thickness or depth of the stock being operated upon to present the upper surface of the stock substantially uniformly to the staple driver regardless of variations in the surface level of the stock. Such a support, hereinafter referred to as the outside clincher, is provided beneath each outside stapler unit.

Referring to Figs. 4 and 18 and particularly to the isometric view of Fig. 18, the outside clincher is mounted on cross-bars 249 and 250, which extend across the machine beneath the stapler units and below the travel level of the box parts. As shown in Figs. 10 and 50, the cross-bars 249 and 250 are unitized by plates 251 secured to the ends thereof. The plates 251 are adjustably supported in vertical grooves provided in frame members 252 secured to the inner surface of the main frames 12 and 13 (Fig. 10) to permit the clincher bars 249 and 250 to be raised or lowered as hereinafter described. Referring again to Fig. 18, a body member 264 of the outside clincher is suitably notched to receive the supporting cross-bars 249 and 250. In the under surface of body member 264 and midway between the notches, there is a recess 265 of an accommodating diameter to provide clearance about the clincher shaft 162. The outside clincher is adjustably secured to the cross-bars 249 and 250 by clamp bolts 266 pivotally connected to body member 264 and extending downwardly a sufficient distance below the clincher bars 249 and 250 to receive thereon a clamp plate 267 and clamp nuts 268.

Overlying body member 264 and pivotally connected to each end thereof by links 270 is a work support member 269 adapted to be raised or lowered relative to body member 264 in the manner hereinafter described. As shown in Figs. 18, 19, and 20, the central portion of the top surface of work support member 269 is recessed to receive a hardened plate 274 secured in said recess by screws 273. The top surface of plate 274 is also recessed to receive a number of hardened roller pins 275. Resting upon the roller pins 275 is a movable hardened plate 277 which contacts and supports the cleat *a* during a staple driving operation. As shown in Fig. 20, plate 277 is provided with depending side flanges 276 to guide the plate 277 in its movement on roller pins 275. The cleat support plate 277 is yieldingly retained in its normal position on roller pins 275 (Fig. 18) by a spring 279 secured thereto and to pin 280 secured in member 269. When plate 277 is pressed into frictional contact with a moving cleat *a*, as hereinafter explained, the plate will move with the cleat against the resistance of the spring 279 and will be returned to initial position by the spring when the pressure is released.

The outside clincher unit is so adjusted vertically that the distance between the upper surface of plate 277 and the lower edge of a lobe 247 depending from the stapler housing is sufficient to permit the work to pass freely over the clincher unit between staple driving operations. Just prior to a staple driving operation, work supporting member 269 and its movable plate 277 are raised as hereinafter explained until the upper surface of the work contacts the lobe 247 of the stapler unit. The work is then in correct position to receive the staple. Member 269 is held or locked in its raised position during the driving of the staple by the mechanism now to be described.

Interposed between the body member 264 and the work support member 269 is a movable forked wedge member 281. The prongs 282 of wedge member 281 have horizontal top surfaces which slidably contact the under surface of member 269 and have upwardly-inclined or beveled under surfaces 283 which slidably contact complementary bevels 284 on the upper surface of the body member 264. The shank or handle members 288 of the wedge member 281 extend into bores 286 in member 269. By reference to Fig. 19, it will be apparent that movement of wedge member 281 to the left will permit member 269 to drop and that movement of wedge member 281 to the right will raise member 269. Wedge member 281 is yieldingly urged toward the right in Fig. 19 to raise member 269 by coil springs 285 housed within bores 286 and interposed between stop members 287 and a shoulder on the wedge member 281 so that, when permitted to function, the springs 285 will move wedge member 281 to the right until the work is raised into contact with the lobe 247 on the stapler housing. The wedge member 281 will then be held by the springs and friction of the contact surfaces on the wedge member in the supporting position shown in Fig. 19 during a staple driving operation. After the stapling operation, the wedge member 281 will be moved to the left against the action of the springs 285 by a cam 290 operating against finger 289 projecting downwardly from wedge member 281. Cam 290, which is adjustably keyed on the clincher shaft 162 is so constructed and timed as to allow the springs 285 to move the wedge member 281 to the right just prior to a staple driving operation and to move the wedge member 281 to the left against the action of the springs 285 after the staple is driven. In Fig. 19 a staple has just been driven. Rotation of clincher shaft 162 in a counter-clockwise direction will cause cam 290 to move wedge member 281 to the left and permit member 269 to drop to initial position.

As hereinbefore stated, clincher shaft 162 is driven from a sprocket 164 on main shaft 59 by a chain 163 and sprocket 161 keyed to shaft 162.

It will be noted that the wedge member 281 functions to adjust and positions the support or clincher plate 277 relative to the stapler for a stapling operation and also functions as a positive support for the plate 277 during a staple driving operation.

*Automatically adjustable clincher for inside staples*

Heretofore, in the manufacture of wirebound boxes and crates, the mechanisms used for clinching the legs of staples driven by the inside staplers have not been satisfactory. Uniform clinches could not be produced by the clinching devices used, and frequently the staples would buckle during the driving operation. Various types of clinching devices have been used, but they all included a hardened clincher plate relatively stationary with the work during a driving operation. Consequently, when the staple was driven through the work, the points contacted the relatively stationary hardened clincher plate with various results: At times, both legs of a staple would be deflected and properly clinched; at other times, one leg of a staple would be well clinched, and the other leg buckled; then again, both legs or the staple head would buckle.

The clinching mechanism of this invention is intended to eliminate the objectionable features of prior clinchers. The clinching unit, of which a detailed description will be given hereinafter, has as part of its mechanism a self-adjusting device to properly position for a stapling operation the hardened clincher plates and the box part resting thereon; that is, to raise the box part until it contacts a lobe projecting downwardly from the bottom of the inside stapler housing and to positively support the box part in such position while the staple is driven and clinched. During the driving operation the clinching plates are moved horizontally relatively to the box part to clinch the staple legs in the direction of movement of the clinching plates. As a result of this combination of movements, the staple legs are uniformly and securely clinched. The use of the clincher of this invention reduces the force required to clinch the staple legs and therefore reduces the load on the machine and the cost of maintenance. Because the clincher produces uniform and secure clinches, lighter gauge staple wire may be used.

It has been stated hereinbefore that there may be one or more intermediate or inside binding wires *c* and that there is one inside stapler unit for each of the intermediate binding wires. An inside clincher will be provided for each inside stapler unit.

One inside clincher is shown in detail in Figs. 23 to 27 inclusive and comprises a stationary body member 291 and an upwardly movable body member 292 which carries the clinching elements. Body member 291 is adjustably secured to crossbars 249 and 250 by clamp bolts 293, clamp plate 294, and clamp nuts 295. Movable body member 292 is connected to stationary body member 291 at each end by links 296 loosely mounted on pins 297 and 298.

Mounted to slide in a recess 299 formed in the top surface of movable body member 292 are two upstanding L-shaped clincher members 300 which are retained in recess 299 by plates 301 which overlie the base of the L and are secured to member 292 by screws 302 (Fig. 25). The clincher members 300 are also guided by extensions 303, which are slidably retained in guideways 304 formed by plates 305 (Fig. 26). As shown in Figs. 23 and 24 and particularly in Fig. 24, each clincher member 300 has detachably secured thereon by screws 306 a hardened clincher plate 307 properly positioned by a key 308. The top surface of each clincher plate 307 is preferably provided with longitudinal grooves 309 to guide a staple leg during a clinching operation (Figs. 23 and 25). Depending from each clincher member 300 is a finger 321 which is kept in contact with the work-face of a cam 320 on clincher shaft 162 by the action of a compressed spring 322 housed in a bore in member 292. For a purpose hereinafter explained, cams 320, acting on fingers 321, move clincher members 300 in opposite directions during a clinching operation.

Interposed between stationary body member 291 and movable body member 292 is a forked wedge member 310. The prongs 311 of wedge member 310 have flat horizontal upper surfaces contacting the under surface of member 292 and have upwardly-inclined or beveled under surfaces 312 contacting a beveled surface 313 of body member 291.

Wedge member 310 is yieldingly urged from the position shown in Fig. 24 toward the position shown in Fig. 27 by compressed springs 314 housed in bores 315 in member 292. Depending from wedge member 310 is a downwardly-projecting finger 318 which contacts the work face of a cam 319 on clincher shaft 162. The shape of the cam 319 is such that between stapling operations when clincher shaft 162 is stationary, wedge member 310 will be held against the action of springs 314 in the retracted position shown in Fig. 24, and when clincher shaft 162 is rotated for a clinching operation, springs 314 will be free to move wedge member 310 toward the position shown in Fig. 27 to raise the side sheet b resting on clincher plates 307 into contact with a lobe 247 depending from the stapler housing and to rigidly support the work while a staple d is fully driven therethrough and clinched (Fig. 27).

Counter-clockwise rotation of the clincher shaft 162 and the cam 319 adjustably keyed thereon, as shown in Figs. 24 and 27, releases the cam pressure on finger 318 of wedge member 310 and permits the compressed springs 314 to move the wedge to the right in Fig. 24 and to raise movable body member 292, which will retain a horizontal position by reason of the pivotal and parallel action of links 296. The member 292 will continue to rise until the hardened clincher plates 307, contacting the under surface of the side sheet b, raise it into contact with the lobe 247 of the stapler housing. When the self-adjusting mechanism has raised the clincher plates to this correct height, they will be rigidly held there by the wedge member 310 during the clinching operation. As shown in Fig. 21, the hardened clincher plates 307 have attained their proper height to rigidly support the side sheet b just prior to the driving of the staple d therethrough; thereafter, as the staple legs are driven through the side sheet b they will be deflected and guided parallel to the binding wire c by a longitudinal groove 309 in the top surface of a clincher plate 307 and by horizontal movement of the clincher plates as now described. As shown in Fig. 27, horizontal longitudinal motion is imparted to the clincher plates 307 by the counter-clockwise rotation of the cams 320 acting on the depending fingers 321 of the clincher members 300. The cams 320 are formed and timed to move one clincher member 300 with the work at a speed in excess of the speed of the work and to move the other clincher member 300 in the opposite direction. The members 300 are so located beneath the stapler that one leg of a staple will contact one clincher plate 307 and the other leg of the staple will contact the other clincher plate 307, with the result that one staple leg will be clinched in the direction of the movement of the work and the other staple leg will be clinched in the opposite direction, as shown in Fig. 52.

After a clinching operation, the members 300 are returned to initial position by springs 322 housed in bores 323 in member 292, and cam 319 moves wedge member 310 against the action of springs 314 to permit movable body member 292 to return to initial lowered position.

*Adjusting mechanism for clincher units as a whole*

To permit the machine to operate on a wide range of stock thickness, mechanism is provided to raise and lower the clincher units as a whole.

As heretofore stated, the several clincher units are carried by cross-bars 249 and 250 unitized by plates 251 permanently secured to the ends of the cross-bars. The plates 251 are slidable in vertical grooves provided in frame members 252 permanently secured to the inner surfaces of the main frames 12 and 13 respectively (Figs. 7, 10, and 50).

Each plate 251 has in the upper portion thereof and midway between the clincher bars 249 and 250 a U-shaped recess 253 of such proportions as to provide a generous clearance about the clincher shaft 162 when the plates 251 are caused to be raised or lowered. The bottom surface of each plate 251 is shaped at an appropriate angle to rest in and be guided by a groove 254 in the upper inclined surface of a movable wedge member 255. The wedge member 255 is retained in and guided by a groove 256 in the top surface of a supporting bracket 257 which is secured to the main frame by bolts 258.

Wedge member 255 is moved horizontally to raise or lower plate 251 by rotation of a shaft 259 rotatably mounted in a bracket 260 and threaded into a threaded bore 263 in wedge member 255. Shaft 259 is held against endwise movement by a collar 261 pinned thereon. It may be rotated by an appropriate handle 262. It will be understood that there is a raising and lowering mechanism for the clinching units at each side of the machine.

*Spacer blocks*

In Fig. 28 there is illustrated the box elements a and b properly positioned on the conveyer bands 21, 21a and 21b by appropriate spacer blocks, hereinafter described. The blank as shown comprises four sections of equal width, two of which have a single solid sheet of side material, and the other two of which have a plurality of spaced sheets of side material forming a slatted construction. One type of spacer block is used to position cleats and sheets, and another type of spacer block is used to position sheets only. Spacer blocks for both cleats and sheets are adjustably secured to outside conveyer bands 21 and 21b, while spacer blocks for sheets alone are adjustably secured to intermediate conveyer band 21a.

Figs. 34 and 36 show a cleat and sheet spacer block secured to left conveyer band 21. A body block 326 rests upon the conveyer band 21 and is provided with a downwardly projecting portion 327 at one end, having a groove 328 of a width and depth to receive the edge of the conveyer band 21. To cooperate with the groove 328 and the edge of the conveyer band inserted therein, there is provided a clamp block 329.

Body block 326 is held on conveyer band 21 by the clamp block 329, which engages the other edge of conveyer band 21 and is secured to body block 326 by a clamp screw 330. The bottom surface of the body block 326 has formed therein an inverted U-shaped groove or recess 331 to provide clearance about the studs 20 projecting from the face of the conveyer band drive sprockets 19 and idler sprockets 9.

The body block 326, of a desired height, has cut in the right-hand end (the end adjacent the cleat support 38) a vertical slot 332, into which is inserted a fabricated unit which functions to position and guide the cleat a, to provide the proper overlap by relatively positioning the side sheet b with the cleat a, and to provide the necessary space between the edges of the side sheets b at a folding corner of the blank. The fabricated unit is securely clamped in the vertical slot 332 by clamp screw 333 and projects horizontally over cleat support 38.

A general outline of the fabricated unit is shown in Fig. 34, and a cross section thereof is shown in Fig. 35. Permanently secured to each side of an insert member 334 at a predetermined distance from body block 326 are lateral cleat guides 335, the vertical edges of which are flared or bent to facilitate the placing of the end of a cleat a in position on the cleat support bar 38 between body block 326 and cleat guides 335. Each cleat end is positioned laterally by longitudinal bar 41 and a cleat guide 335, and adjacent cleat ends are spaced and positioned by the thickness of insert member 334. Adjacent side sheets b are spaced and positioned by a fin 337 secured to insert member 334. To accommodate cleats of different width and side material of different thickness, different fabricated positioning units are provided, which may readily be secured to or removed from body block 326 by manipulation of clamp screw 333.

Body block 326 is provided with a pair of spaced holes 341 and 342 threaded to receive a trip stud 343 to cooperate with the staple controlling mechanism described hereinafter.

The cleat and sheet spacer blocks for the right conveyer band 21b may be similar to the cleat and sheet spacer blocks for the left conveyer band 21, just described, except that they do not carry trip studs 343.

The intermediate conveyer band 21a carries spacer blocks 355 for sheets only, of such construction as that of the two slatted blank sections shown in Fig. 28. The sheet spacer block 355 (Figs. 30 and 31) comprises a body block 356 resting on the intermediate conveyer band 21a and clamped thereto by a clamp block 358 secured by a clamp screw similar to clamp screw 330 of the cleat-and-sheet spacer block hereinbefore described.

Permanently secured to the front side of the sheet spacer 355 is an upstanding fin 360, which may be cylindrical or rectangular in shape, for spacing adjacent sheets or slats intermediate the cleat ends. In order to retain the slats parallel with each other and at a right angle to the cleats a, sheet positioning devices 361 similar to sheet positioning devices 355 are secured to right conveyer band 21b intermediate the cleat and sheet spacer blocks secured to said conveyer band 21b.

*Support for side sheets intermediate their ends*

The side sheets b, which rest at their ends upon the cleats a, in their passage through the machine may be supported intermediate their ends by a blade 373 (Figs. 30 and 31) carried by a bar 364. The bar 364 is supported at the front end of the machine on cross-beam 3 and is yieldingly supported at the rear end of the machine on cross-beam 15 by means of springs 367 coiled about studs 368 carried by a clamp block 369 secured to cross-beam 15. Studs 368 pass through openings in lateral extension 370 of bar 364. Threaded on the upper ends of studs 368 are nuts 372 for raising or lowering the blade 373 relative to the staplers which operate upon the sheets b. As shown in Fig. 1, two blades 373 are incorporated in the illustrative machine.

*Presser units*

To insure that the side sheets b are kept in a horizontal plane when they are presented to the staplers to be operated upon, there is provided a pair of presser units, each comprising a blade 374 which contacts the upper surface of the sheets b with a yielding pressure. Each blade 374 is retained in a vertical slot 375 formed in a body member 376 and is yieldingly pressed against the top surface of the side sheet b by springs 377 housed in accommodating bores 378 in the body member 376 and interposed between the solid portion thereof and the bottom of convenient slots 379 in the blade 374. Vertical movement of blade 374 is limited by pins 380 secured to the body member 376 and extending into elongated slots 381 in blade 374. Permanently secured at a convenient location on the top surface of the body member 376 is a vertical bar 382 which is slidably retained in a slot 383 of a bracket 384 by a plate 385. Bracket 384 is adjustably secured on a bar 388 secured to stapler bar 185 by screws 389. The position of the blade 374 relative the top surface of the side sheets b may be varied by an adjustable stop stud 387 threaded in the top surface of the bracket 384 which contacts the under side of a projection 386 extending from the upper portion of the vertical bar 382. To quickly raise the blade 374 a distance above the work to facilitate the repositioning of side sheets that may have been erroneously positioned in the first instance by the stock layers, there is provided a fulcrumed foot pedal 390 (Figs. 3, 4, and 8) and a rod 391 pivotally connected to a lever 392 permanently secured on a square bar 393 having its ends loosely mounted in brackets 394 fastened to the main frames 12 and 13. The square bar 393 has projecting therefrom a tongue 395 of a convenient length and shape to be loosely retained in a groove 396 in the upper portion of the vertical bar 382. By stepping on the fulcrumed foot pedal 390, an upward rocking motion will be imparted to the square bar 393 by the pivotal connection of rod 391 with the lever 392, thereby causing the tongue 395 to raise the vertical bar 382 and body member 376 with the blade 374. To return the foot pedal 390 to its initial position and to permit the blade 374 to rest upon the work, there is provided a spring 397 having one end attached at a convenient location on the foot pedal 390 and the other end secured on a stud 398 projecting from the inner surface of the left main frame 12, as shown in Fig. 7.

Staple positioning mechanism

The work is advanced by means of the conveyer bands 21, 21a, and 21b beneath the staplers, which are caused to operate at predetermined selected times to locate or position the staples in the work in accordance with a desired staple pattern selected for the particular box blank being operated upon.

The staple positioning mechanism preferably comprises several co-acting devices which are electrically controlled and operate automatically.

As heretofore pointed out, the stapling operations are controlled by energizing and deenergizing the solenoid 120. Through the connections and devices now to be described, solenoid 120 is energized when a rocking pattern bar 405 is rocked in one direction and de-energized when pattern bar 405 is rocked in the other direction.

As shown in Figs. 28, 29, 30, and 39, pattern bar 405 is suspended at each end, from an inverted L-shaped bracket 407 secured to inverted channel member 33. The overhanging portion of each bracket 407 carries a stud 411 which enters a bore in a hanger 410, the lower end of which is secured to pattern bar 405.

The rocking of pattern bar 405 operates a switch 406 which controls the operation of the solenoid 120. Switch 406, which is normally closed, is carried on the top surface of a bracket 408 secured intermediate the brackets 407 to inverted channel member 33. The overhanging portion of bracket 408 has journaled therein a short shaft 413, frictionally mounted so that when pattern bar 405 is swung or rocked in one direction, it will remain stationary until rocked in the other direction. Keyed to one end of shaft 413 is a hanger 412, the lower end of which is secured to pattern bar 405 so that when the pattern bar is rocked, shaft 413 will be rocked. The other end of shaft 413 carries an upstanding finger 409 adapted to open switch 406 when rocked thereagainst.

Pattern bar 405 is rocked by trip studs 343 located in one or the other of holes 341 and 342 of cleat and sheet spacers 326, hereinbefore described. Trip studs 343, in their travel with conveyer band 21, engage either control blocks 416 or 417 adjustably secured to a flange 414 or a flange 415 of pattern bar 405. Control blocks 416 are provided with a bevelled face 418 to rock the pattern bar to the left in Fig. 31 when contacted by a trip stud 343, and control blocks 417 are provided with a beveled face 419 to rock the pattern bar in the opposite direction.

The pattern bar switch 406 is normally closed to energize the main clutch solenoid 120 (Fig. 53) which, as hereinbefore described, actuates the clutch trip toggle mechanism. The clutch trip toggle mechanism comprises a horizontal toggle 124 pivotally connected to a rock lever 122 loosely mounted on shaft 123 housed in bracket 125 secured to outboard frame 14. The rock lever 122 is caused to rock, by its pivotal connection to the adjustable member 121, which is pivotally connected to the solenoid plunger.

Figure 54:
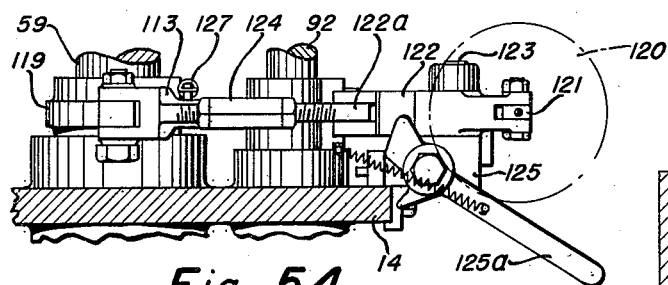
Fig. 54 is a partial top plan view of Fig. 53, showing the safety lever in its functioning position.

Pivotally connected to the horizontal toggle 124 is a vertical toggle 126 of a collapsible design. The vertical toggle 126 comprises a pair of links 114 and 116 loosely connected to each other by a bolt providing a weak-knee joint 117. A rock lever 113 keyed on the clutch control shaft 92 is loosely secured to the upper portion of the vertical toggle 126, which has rotatably mounted in the bottom thereof a suitable roller 118 which contacts the work face of a clutch control cam 119. To urge the collapsing of the vertical toggle 126 at the weak-knee joint at the proper time, there is provided a spring 127 with one end fastened to the rock lever 113 and the other end fastened to a lever 128 loosely mounted on shaft 129 and pivotally secured to the lower portion of the vertical toggle 126. To retain the horizontal toggle 124 and the vertical toggle 126 in a non-operable position, as shown in Fig. 53, there is provided a manually-operated safety lever 125a pivotally secured on the top of bracket 125, which may be positioned as shown in Fig. 54 to contact the top surface of the rock lever 122, thereby locking the solenoid plunger in the energized position. The clutch trip toggle mechanism will transmit a rocking motion to the clutch and brake control shaft 92 according to the operation of the main clutch solenoid 120 and the clutch control cam 119.

To release the main clutch from driving the main shaft 59, the solenoid 120 is energized, thereby straightening the vertical toggle 126, which will be urged upward by the clutch control cam 119 through its contact with the roller 118 to impart an upward rocking motion to the rock lever 113 keyed on the clutch control shaft 92. Referring to Figs. 10 and 46, and particularly to Fig. 10 in which the view is taken looking toward the left-hand side of the machine and therefore shows the movement of the clutch control shaft 92 as counter-clockwise, the lever 105 is pulled upward through lever 99 and rod 103, thereby applying or causing engagement of the main clutch brake 98, which will release the clutch band from its frictional contact with the inside of the sheave pulley 60. Sheave pulley 60 will continue to rotate freely on the main shaft 59 by its connection to the motor 62, through the sheave belts 63. The instant the clutch brake 98 is applied, the slight over-travel of the main shaft 59 will cause the member 400 to continue likewise, thereby urging the end of the clutch band 399 fastened thereto toward its other end, which is pivotally fastened to a collar portion 401 of the brake drum 112 loosely mounted on the hub of the member 400. This action tends to draw the clutch band inwardly and away from the clutching surface provided in the sheave pulley 60. A spring 402 fastened to an ear 403 on the member 400 and to an ear 404 on the collar portion 401 is stretched by the above-mentioned action, thereby storing sufficient energy to expand the clutch band 399 when the clutch brake drum 112 is released.

Operation of machine

Figure 43:
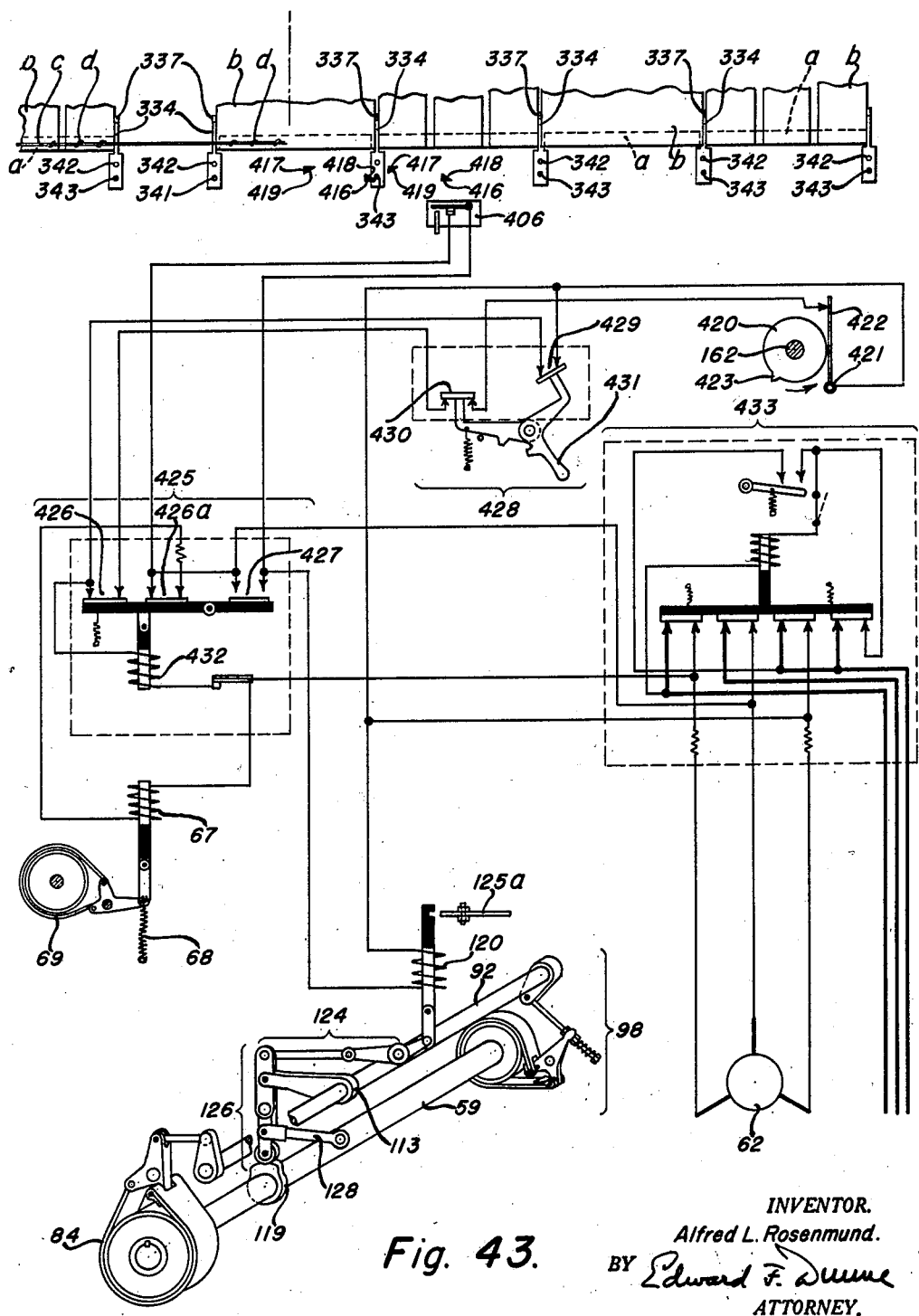
Fig. 43 is a wiring diagram control circuit.

Fig. 43 shows a diagram of the electrical circuit for controlling the operation of the machine. A solenoid control contactor 425 interlocks electrically the main clutch solenoid 120 and the conveyer clutch solenoid 67. This is a magnetic switch which contains two normally open contacts and one normally closed contact. The normally closed contact is connected in parallel with the pattern bar switch 406.

Referring to Figs. 7, 43, and 49, there is provided a synchronizing cam 420 keyed on the extreme right end of the clincher shaft 162 projecting beyond the outside of the right main frame 13. Fastened to a bracket 424 secured to the right main frame 13 is a synchronizing switch 421, which is normally closed (Fig. 49) and which has fastened thereto, adjacent the synchronizing cam 420 an upwardly extending member 422 which is contacted by a lobe 423 on the synchronizing cam 420 at the proper time to open the synchronizing switch 421, the function of which will be fully described hereinafter.

Referring to Figs. 6 and 43, an operator's control switch 428 retains therein one normally open contact 429 and one normally closed contact 430. The normally open contact 429 is connected, in series, with a magnetic coil 432 of the solenoid control contactor 425 and the power supply. The normally closed contact 430 is connected, in series, with the synchronizing switch 421 and the normally open contact 426 of the solenoid control contactor 425, which series circuit is connected in parallel with the contact 429.

As heretofore stated and as shown in Figs. 28 to 31 inclusive, the staple positioning mechanism is electrically controlled and automatically operated by the trip studs 343 carried by cleat spacer blocks 326 secured to conveyer band 21, which studs rock pattern bar 405 to operate switch 406. As shown diagrammatically in Fig. 43, power is supplied to the staple positioning control circuit and to the main drive motor 62 of the machine through a magnetic contactor 433. With the magnetic contactor 433 closed, the main drive motor 62 is energized and power is available at the control circuit.

The sequence of operations that locate staples in the box sections as desired according to a specified pattern are as follows: With the drive motor 62 rotating and the control circuit energized, current passes through closed contact 427 to energize the main clutch solenoid 120, thus holding the horizontal and vertical toggle linkages 124 and 126 in straight position and maintaining the control shaft 92 (by counter-clockwise rocking thereof, as shown in Fig. 10) in a rocked position, which holds the main clutch control brake 98 engaged (Figs. 10 and 47), thereby keeping the main clutch released, and also holds the main brake 84 engaged, thus holding the main shaft stationary. A safety lever 125a (Figs. 53 and 54) is released manually from engagement with the horizontal toggle 124, which is pivotally connected to the main clutch solenoid plunger to permit said plunger to operate when actuated by the pattern bar switch 406.

To start operation of the machine, the handle 431 of the operator's control switch 428 is pulled forward (Figs. 6 and 43) to close contact 429. This energizes the solenoid contactor 425 by current passing through the magnetic coil 432 and closes contacts 426 and 426a, while at the same time opening contact 427. Current passes through contact 426a to energize the conveyer clutch solenoid 67, which disengages the conveyer clutch brake 69 against the action of the brake spring 68, thus engaging the conveyer clutch and causing the conveyer bands 21, 21a, and 21b to move at a uniform speed in the direction indicated by the arrow in Fig. 1. Opening of contact 427 leaves main clutch solenoid 120 free to act in accordance with the action of the pattern bar switch 406. The plunger of the main clutch solenoid 120 does not change position by the above-mentioned action, since pattern bar switch 406 is normally closed (Fig. 31 and 43) and holds solenoid 120 in the energized position.

With staple control blocks 416 and 417 previously located on the pattern bar 405 to correctly position the staples $d$ as desired, continued movement of the conveyer band 21 will bring a trip stud 343 into contact with the beveled portion 418 of a staple control block 416 and rock the pattern bar 405 clockwise (Fig. 31) to cause vertical finger 409 to open the pattern bar switch 406. This will stop the current passing through the main clutch solenoid 120, and the solenoid plunger will drop downward by action of a compression spring housed in the solenoid plunger, thereby breaking the horizontal toggle 124, which, in turn, breaks the vertical toggle 126 and permits the control shaft 92 to rock clockwise (Fig. 10) by means of the lever 113 connected thereto. This rocking motion of the control shaft 92 will release the main brake 84 and the clutch control brake 98 (Fig. 9) to permit the engaging of the main clutch, thereby causing rotation of the main shaft 59 at a uniform speed. Through the appropriate driving mechanism, described hereinbefore, and the operation of the staplers, the staples $d$ will be driven into the box sections at regular intervals due to the uniform speed of the main shaft 59 and the conveyers 21, 21a, and 21b. Staples will continue to be driven at regular intervals (three as illustrated in Fig. 28) until trip stud 343 engages the beveled portion 419 of a staple control block 417 to cause the pattern bar 405 to rock or return to its initial position, thereby moving the vertical finger 409 away from pattern bar switch 406 to permit the switch to close. This action will energize the main clutch solenoid 120, which will straighten the horizontal toggle 124 and, in turn, the vertical toggle 126. At this point in the cycle, the clutch control cam 119 is at its low point. As the main shaft 59 rotates toward neutral position, the clutch control cam 119 raises the straightened vertical toggle 126 to rock the control shaft 92 (Fig. 53) upward by the lever 113 connected thereto, thus to engage the clutch control brake 98, which will disengage the main clutch and cause the engagement of the main brake 84, thereby stopping the main shaft 59 in neutral position. The work continues to move, but no staples are driven until a trip stud 343 engages a control block 416, when the staplers are again thrown into operation. The arrangement is such that when a trip stud 343 contacts a staple control block 416 the staplers will be thrown into operation and when a trip stud 343 contacts a staple control block 417 the staplers will be thrown out of operation. Thus it will be seen that the location of the staples in the work may be varied and controlled by the location of the staple control blocks 416 and 417 on the pattern bar 405.

When it is desired to stop the motion of the conveyer bands 21, 21a, and 21b, the operator's control switch handle 431 is returned to its central position, as shown by broken lines in Fig. 6, which opens contact 429 (Fig. 43). If the main shaft 59 is in motion and staples $d$ are being driven, the machine continues to operate until the synchronizing cam 420 (Fig. 49) opens the synchronizing switch 421 (which is normally closed). This stops current from passing through the magnetic coil 432 of the solenoid control contactor 425; and since current cannot pass through contact 429 of the operator's control switch 428 to the magnetic coil 432, the solenoid control contactor 425 is de-energized, thus opening contacts 426 and 426a and closing contact 427. Current passing through the closed contact 427 energizes the main clutch solenoid 120 and stops the rotation of the main shaft 59 in neutral position, as previously described. Since contact 426a is now open, current no longer passes through conveyer clutch solenoid 67, which is now de-energized, thereby permitting the brake spring 68 to engage the conveyer clutch brake 69. This disengages the conveyer clutch and stops movement of the conveyers 21, 21a, and 21b.

If the main shaft 59 is not in motion and no staples are being driven when the control handle 431 is returned to central position, as shown in broken lines in Fig. 6, the conveyers 21, 21a, and 21b continue to move until the control handle 431 is moved beyond central position to open contact 430. This stops current from passing through the magnetic coil 432 of the solenoid control contactor 425, and, since current cannot pass through the contact 429 of the operator's control switch 428 to the magnetic coil 432, the solenoid control contactor 425 is de-energized, thus opening contacts 426 and 426a and closing contact 427. Since current cannot pass through contact 426a, the conveyer clutch solenoid 67 is de-energized, thereby stopping the movement of the conveyers 21, 21a and 21b, as described hereinbefore.

The staple positioning mechanism described hereinbefore is designed to control the location of staples d according to a specified pattern, on a box blank of four equal sections, such as the one illustrated in Fig. 28, or on a box blank of unequal sections, such as the one partially shown in Fig. 38, in which the first and third sections are comparatively wider than the second and fourth sections.

The box blank illustrated in Fig. 28 comprises four equal sections. Reading from left to right, the sections assume the following positions: top, rear side, bottom, and front side. The top and bottom sections are composed of cleats and one solid thin sheet; and the rear and front sides, of cleats and slats. Each section will have six rows of staples driven therein, as shown by the completed blank in Fig. 41.

As shown in Figs. 6 and 43, the conveyers can be assumed to be in motion, since the operator's control handle 431 is in forward position and a series of three rows of staples have been driven. According to this particular staple pattern, each section requires the same number of staples in the same location; that is, there are three rows of staples equally spaced, followed by a longer space; and then three more rows of staples equally spaced, as were the first series of three, and then a longer space from the last staple in the first section to the first staple of a series of three in the second section. When it is desired to make a box blank of four equal sections, requiring the same number of staples similarly positioned in each section, the engaging blocks 416 and the disengaging blocks 417 may all be secured either on the left flange 414 (Fig. 30) or all on the right flange 415 of the staple pattern bar 405. In this particular case, all are secured on the left flange 414 of the staple pattern bar 405, clearly shown in Figs. 28, 30, and 31. Therefore, the trip stud 343 provided to contact the beveled portions of the blocks 416 and 417 is located in the outside position in threaded hole 341 of the spacer blocks 326, as shown in Figs. 34 and 36. Since only the spacer blocks that position the trailing edge of each section actuate the staple pattern bar 405 by the trip studs 343 mounted thereon, the lead spacer block that positions the forward edge of the first section requires no trip stud 343.

As shown in Figs. 28 and 29, the box blank moving in the direction indicated by the arrow has the first series of three rows of staples driven therein. The point at which the staple driving occurs is indicated by the heavy dot and dash line. Therefore, it will be seen that the trip stud 343 in the spacer block 326 has contacted the beveled portion 418 of the first engaging block 416 properly located on the left flange 414 of the pattern bar 405, thereby rocking the pattern bar 405 clockwise, which, in turn, has caused the finger 409 to open the pattern bar switch 406 (which is normally closed) to de-energize the main clutch solenoid 120 by stopping the current passing therethrough and permitting its plunger to drop down, thereby breaking the horizontal toggle 124 and the vertical toggle 126 and collapsing the weak-knee joint (shown in broken lines in Fig. 53). The downward rocking motion of the rock lever 113 has imparted a similar movement to the clutch control shaft 92, thereby releasing the main brake 84 and the main clutch control brake 98, which has permitted the spring 402 to contract, expanding the clutch band to frictionally engage the sheave pulley 60 which rotates continuously, thereby clutching the main shaft 59 thereto and causing staple forming and driving operations (being a series of three in this case) to continue until the trip stud 343 has contacted the beveled portion 419 of the first disengaging block 417, which is the second block located on the left flange 414 of the pattern bar 405, thereby rocking the pattern bar 405 back to its initial position, thus removing the finger 409 to permit the pattern bar switch to close. The closing of the pattern bar switch 406 has again energized the main clutch solenoid 120 to attract its plunger upwardly, thereby positioning the vertical toggle 126 to be acted upon by the clutch control cam 119, which has imparted an upward movement thereto, causing the rock lever 113 to rock upward or clockwise (Fig. 53) and the clutch control shaft 92 to apply the clutch control brake 98, declutching the main shaft 59 from the sheave pulley 60, which will continue to rotate freely.

Figure 32:
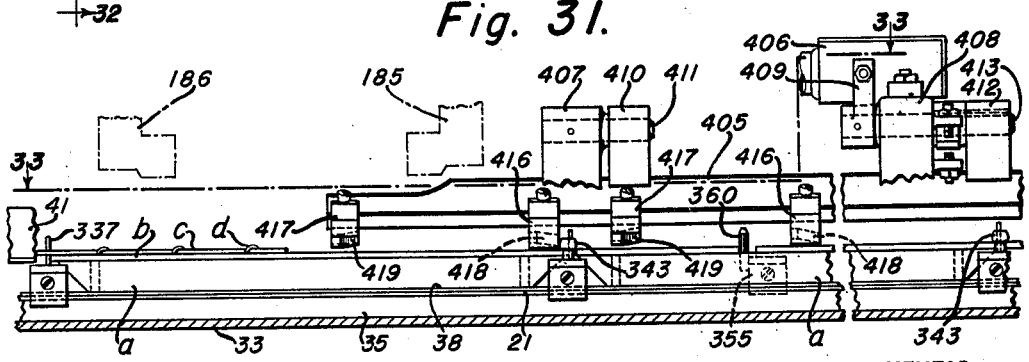
Fig. 32 is a vertical sectional view, on the same scale, taken on line 32—32 of Fig. 31, showing the inclined tripper block surfaces and the relative positions they take on the pattern bar when the box blank has reached the stapled position shown in Figs. 28 to 31 inclusive.

The operation just described is clearly shown in Figs. 28, 32, and 33. The trip stud 343 mounted in block 326, which positions the trailing edge of the first section (top) is moving in the direction of the arrow (Fig. 28). During the travel of trip stud 343 to the position shown in Figs. 28, 32, and 33, it has actuated the pattern bar 405 and finger 409 by its contact with bevel 418 of the engaging block 416 to open the pattern bar switch 406 to permit three complete cycles of the staple forming and driving mechanism to drive three rows of staples, and as the third staple of the series is being driven, the trip stud 343 contacts the bevel 419 of the disengaging block 417 to rock the staple pattern bar 405 and finger 409 back to their initial positions, permitting the pattern bar switch 406 to close, thus energizing the main clutch solenoid 120 which, through its associated connections, applies the main clutch control brake 98 and declutches the main shaft 59 from the sheave pulley 60, thereby bringing to rest in their respective initial positions the staple forming and driving mechanism and the relative mechanisms that cooperate therewith during a staple forming and driving operation. While the staple forming and driving mechanism is at rest, the conveyer bands 21, 21a, and 21b continue to move at a uniform rate of speed to move the trip stud 343 toward the next engaging block 416 located on the left flange 414 of the pattern bar 405 a predetermined distance from the last-mentioned disengaging block 417, which provides a longer space between the third staple of the series of three staples driven (Figs. 28, 32, and 33) and the first staple of the next series of three staples, which are indicated by broken lines in Figs. 28 and 33. Further movement of the trip stud 343 causes it to contact the bevel 418 of the next engaging block 416, which is identical with the first engaging block that the trip stud 343 contacted. Thereupon, three complete cycles of the staple forming and driving mechanism are performed, driving three rows of staples equally spaced. As the third staple of the second series of three is being driven, the trip stud 343 contacts the bevel 419 on the next and last control block, which is a disengaging block 417 located adjacent the end of the left flange 414 of the pattern bar 405, to again bring the staple forming and driving mechanism to rest by permitting the pattern bar switch to be closed. To perform the staple pattern operation, which has just been described, requires two groups of two blocks, each group consisting of an engaging block 416 and a disengaging block 417 located a predetermined distance from each other on the pattern bar 405 to permit two series of three staples each to be driven with a predetermined gap therebetween. As mentioned hereinbefore, the box blank described comprises four equal sections; therefore, the staple pattern will be duplicated in the other three sections as the cleat positioning blocks that position the trailing edge of each section present their trip studs 343 to a contacting position with the bevels 418 and 419 on the engaging and disengaging blocks 416 and 417 respectively.

Assuming that the first (top) and third (bottom) sections are wider than the second (rear side) and fourth (front side) sections and that it is desired to drive six rows of staples in the first and third sections and four rows of staples in the second and fourth sections, as shown in Fig. 38, where such a blank is partially illustrated, the engaging blocks 416 and disengaging blocks 417 may remain in the same positions on the left flange 414 of the pattern bar 405, as just described, since six rows of staples are also required for the first and third sections of this blank. The trip studs 343 in the trailing spacer block of the first (top) section and in the trailing spacer block of the third (bottom) section will be mounted in the outside position in the threaded hole 341, as described above and shown in Figs. 34 and 36. The pattern bar 405 and finger 409 will be actuated to open the pattern bar switch and thereby perform a series of staple forming and driving operations similar to those fully described hereinbefore on the box blank with four equal sections.

To accommodate the second (rear side) and fourth (front side) sections by driving four rows of staples therein, it is necessary to locate the engaging blocks 416 and disengaging blocks 417 on the right flange 415 of pattern bar 405 as viewed in Figs. 38 and 39; and to properly contact the bevels thereon, the trip studs 343 are mounted in the inside position or in the threaded holes 342 of trailing spacer blocks of the second and fourth sections. Since there are four staples equally spaced in the second and fourth sections, only one engaging block 416 and one disengaging block 417 are required on the right flange 415 of pattern bar 405.

As the last staple is being driven in the first section, the trip stud 343 contacts the disengaging block 417 secured adjacent the end of the left flange 414 of the pattern bar 405 to arrest the staple forming and driving mechanism until such time as the trailing spacer block of the second section, with the trip stud 343 mounted in the inside position in the threaded hole 342, has moved to a position wherein the trip stud 343 will contact the bevel 418 of the engaging block 416 located on the right flange 415 to cause the pattern bar 405 and finger 409 to rock clockwise to open the pattern bar switch 406. As described hereinbefore, the main clutch solenoid 120 is deenergized, allowing its plunger to drop and, through its associated connections, to release the main brake 84 and also the main clutch control brake 98 to permit the main clutch elements to perform a clutching operation by clutching the main shaft 59 to the sheave pulley 60 which rotates continuously once the motor 62 is energized, thereby causing the staple forming and driving mechanism to function.

Since the main shaft 59 rotates at a uniform rate of speed, staples will be driven equally spaced from each other, and with the engaging block 416 located a predetermined distance from the disengaging block 417, the staple forming and driving mechanism will be permitted to operate four complete cycles wherein four rows of staples will be driven. As the fourth staple is being driven the trip stud 343 will contact the disengaging block 417 located adjacent the end of the right flange 415, thereby rocking the pattern bar 405 and the finger 409 back to their initial positions to allow the pattern bar switch 406 to close, which will cause the main clutch solenoid 120 to become energized, thus attracting its plunger upward; and, through its associated linkage and connections, the main clutch control brake 98 will be applied, thus declutching the main shaft 59 from the sheave pulley 60 to arrest further operation of the staple forming and driving mechanism until such time as the trip stud 343 mounted in the outside position in the threaded hole 341 on the trailing spacer block of the third section, contacts the bevel 418 on the engaging block 416 located on the left flange 414 of the pattern bar 405.

As the completed box blanks pass beyond the stapling plane they ride out onto stripper bars 434, which are supported by cross-bars 435 and 436, as shown in Figs. 1, 4, and 5.

Among other advantages, the machine of this invention is adapted to produce a better and more uniform product at a reduced cost.

It will be understood that the invention is not to be limited to the specific embodiment shown herein for illustration and that all of the inventive features need not be used conjointly as they may be used to advantage in various combinations and sub-combinations as defined in the claims.

The word "box" as used in the claims is intended to include boxes, crates, and other types of shipping containers.

The word "wire" as used in the claims is intended to include wire, straps, and other types of flexible binders.

I claim:

1. In a box-making machine having work-feeding means, stapling mechanism comprising a stationary housing and a staple former operable in the housing and movable with the work during a staple-driving operation.

2. In a box-making machine having work-feeding means, stapling mechanism comprising a stationary housing and a staple former reciprocable in the housing and adapted upon reciprocation in one direction to contact the work and move therewith.

3. In a box-making machine having work-feeding means, stapling mechanism comprising a stationary housing and a staple former reciprocable in the housing and adapted to be moved by the work in the direction of the feed of the work.

4. In a box-making machine having work-feeding means, stapling mechanism comprising a stationary housing and a staple former movable into contact with moving work and adapted to be moved by the work in the direction of the feed of the work.

5. In a box-making machine having work-feeding means, stapling mechanism comprising a stationary housing and a staple driver operable in the housing and movable with the work during a staple-driving operation.

6. In a box-making machine having work-feeding means, stapling mechanism comprising a stationary housing, a staple former, and a staple driver, the staple former and the staple driver being reciprocable in the housing and movable with the work during a staple-driving operation.

7. In a box-making machine having work-feeding means, stapling mechanism comprising a stationary housing, a staple former movable into contact with moving work and adapted to be moved by the work in the direction of the feed of the work, and a staple driver operable in the staple former.

8. In a box-making machine having work-feeding means, stapling mechanism comprising a stationary housing, a staple former, and a staple driver, the staple former and the staple driver being reciprocable in the housing and adapted upon reciprocation in one direction to move in the direction of the feed of the work and upon reciprocation in the other direction to move in a direction opposite to the direction of the feed of the work.

9. In a box-making machine, stapling mechanism comprising a housing and a staple former so mounted as to swing within the housing during a staple-driving operation.

10. In a box-making machine, stapling mechanism comprising a housing and a staple driver so mounted as to swing within the housing during a staple-driving operation.

11. In a box-making machine, stapling mechanism comprising a housing, a staple former, and a staple driver, the staple former and the staple driver being so mounted as to swing within the housing during a staple-driving operation.

12. In a box-making machine having work-feeding means, stapling mechanism comprising a stationary housing and a staple former mounted in the housing to move toward and from the work and to move with the work during a staple-driving operation.

13. In a box-making machine having work-feeding means, stapling mechanism comprising a stationary housing and a staple driver mounted in the housing to move toward and from the work and to move with the work during a staple-driving operation.

14. In a box-making machine having work-feeding means, stapling mechanism comprising a stationary housing, a staple former, and a staple driver, the staple former and the staple driver being mounted in the housing to move toward and from the work and to move with the work during a staple-driving operation.

15. In a box-making machine, stapling mechanism comprising a movable staple former, means to operate the staple former, a separately movable cutter, means to operate the cutter, and means to vary the timed relationship of their movements.

16. In a wirebound box-making machine having fastener-setting mechanism and means to feed box parts thereto, a support for the box parts over which the box parts are fed, said support being automatically adjustable to position uniformly the surface level of the box parts relative to the fastener-setting mechanism and positively to support the box parts so positioned during a fastener-setting operation, whereby fasteners will be driven substantially equal distances into the box parts regardless of variations in the surface level of the box parts.

17. In a box-making machine having fastener-setting mechanism, a support for the box parts automatically adjustable to position uniformly the surface level of the box parts relative to the fastener-setting mechanism and positively to support the box parts so positioned during a fastener-setting operation, and means to move the support in adjusted position with the box parts.

18. In a box-making machine having fastener-setting mechanism, a support for the box parts, means automatically to adjust the support relative to the fastener-setting mechanism to position the surface level of the box parts a predetermined distance from the fastener-setting mechanism prior to a fastener-setting operation and positively to support the box parts so positioned during a fastener-setting operation, and means to move the support in adjusted position with the box parts during a fastener-setting operation.

19. In a wirebound box-making machine having fastener-setting mechanism and means to feed box parts thereto, a positive support for the box parts over which the box parts are fed and means automatically to adjust the support relative to the fastener-setting mechanism in accordance with the variations in the surface level of the box parts.

20. In a box-making machine having fastener-setting mechanism, a positive support for the box parts, means automatically to adjust the support relative to the fastener-setting mechanism in accordance with the variations in the surface level of the box parts, and means to move the support in adjusted position with the box parts.

21. In a box-making machine having fastener-setting mechanism, a support for the box parts, means controlled by the surface level of the box parts to adjust the position of the support relative to the fastener-setting mechanism and positively to hold the support in adjusted position during a fastener-setting operation, and means to move the support with the box parts during a fastener-setting operation.

22. In a box-making machine having work-feeding means and staple-driving mechanism, means to clinch staple legs that are driven through moving box parts comprising a pair of clincher plates so positioned relative to the staple-driving mechanism that one leg of a staple driven through a box part will strike one clincher plate and the other leg of the staple will strike the other clincher plate, and means to move the clincher plates in opposite directions to clinch the staple legs in opposite directions.

23. In a box-making machine having staple-driving mechanism including a staple driver, means to clinch staple legs that are driven through the box parts comprising a pair of clincher plates so positioned relative to the staple-driving mechanism that one leg of a staple driven through a box part will strike one clincher plate and the other leg of the staple will strike the other clincher plate, and means to move the clincher plates in opposite directions during a movement of the staple driver to insert a staple so that the staple legs are clinched in opposite directions.

24. In a box-making machine having work-feeding means and staple-driving mechanism, means to clinch staple legs that are driven through moving box parts comprising a pair of clincher plates so positioned relative to the staple-driving mechanism that one leg of a staple driven through the box part will strike one clincher plate and the other leg of the staple will strike the other clincher plate, and means to move one clincher plate in the direction of movement of the work at a speed in excess of the speed of movement of the work and to move the other clincher plate in the opposite direction.

25. In a box-making machine having work-feeding means and staple-driving mechanism, means to clinch a staple leg that is driven through a box part comprising a clincher plate movable with the work during a staple-driving operation at a speed in excess of the speed of the moving work.

26. In a box-making machine having work-feeding means and staple-driving mechanism, means to clinch a staple leg that is driven through a moving box part comprising a clincher plate and means to move it with the box part during a clinching operation at a speed that exceeds the speed of movement of the box part.

27. In a wirebound box-making machine having work-feeding means and staple-driving mechanism, staple-clinching means over which the box parts are fed comprising a clincher plate and means automatically to adjust its position relative to the staple-driving mechanism in accordance with variations in the surface level of the box parts and positively to maintain it in such adjusted position during a staple-driving operation.

28. In a box-making machine having work-feeding means and staple-driving mechanism, staple-clinching means comprising a clincher plate, means automatically to adjust its position relative to the staple-driving mechanism in accordance with variations in the surface level of the box parts and positively to maintain it in such adjusted position during a staple-driving operation, and means to move the clincher plate in its adjusted position with the moving box part during a staple-driving operation.

29. In a box-making machine having work-feeding means and staple-driving mechanism, staple-clinching means comprising a clincher plate, means to adjust its position relative to the staple-driving mechanism in accordance with variations in the surface level of the box parts and to maintain it in such adjusted position during a staple-driving operation, and means to move the clincher plate in its adjusted position with the moving box part during a staple-driving operation at a speed in excess of the speed of movement of the box part.

30. In a box-making machine having a staple driver and means to feed box parts thereto, mechanism for controlling the operations of the staple driver to locate staples at predetermined points in the box parts comprising a solenoid to throw the staple driver into and out of operation, and means movable with the box parts to control the operations of the solenoid.

31. In a box-making machine having a staple driver and means to feed box parts thereto, mechanism for controlling the operations of the staple driver to locate staples at predetermined points in the box parts comprising a solenoid to throw the staple driver into and out of operation, and means carried by the box part feeding means to control the operations of the solenoid.

32. In a box-making machine having a staple driver and means to feed box parts thereto, mechanism for controlling the operations of the staple driver to locate staples at predetermined points in the box parts comprising a solenoid to throw the staple driver into and out of operation, a rocking pattern bar to control the operations of the solenoid, and means to rock the pattern bar at selected times.

33. In a box-making machine having a staple driver and means to feed box parts thereto, mechanism for controlling the operations of the staple driver to locate staples at predetermined points in the box parts comprising a solenoid to throw the staple driver into and out of operation, a rocking pattern bar to control the operations of the solenoid, trip blocks adjustably secured to the pattern bar, and studs carried by the box part feeding means to contact the trip blocks and rock the pattern bar.

34. In a wirebound box-making machine, a constant-stroke staple driver, a staple clincher movable toward and from the staple driver, means to feed box parts over the clincher, and means automatically to move the clincher toward the driver a sufficient distance to position the surface level of the work a predetermined distance from the staple driver prior to a staple-driving operation and positively to hold it in such position during a driving operation.

35. In a box-making machine having work-feeding means, a constant-stroke staple driver, a staple clincher movable toward and from the staple driver, means automatically to position the surface level of the work a predetermined distance from the staple driver and positively to hold it in such position during a driving operation, and means to move the clincher with the work during a staple-driving operation.

36. In a box-making machine having work-feeding means, a constant-stroke staple driver, a staple clincher movable toward and from the staple driver, means automatically to position the surface level of the work a predetermined distance from the staple driver, and means to move the clincher with the work during a staple-driving operation and at a higher rate of speed.

37. A box-making machine comprising a staple driver, a staple clincher located beneath the staple driver a sufficient distance to permit the work to pass freely between the driver and the clincher, means to feed the work between the driver and the clincher, and means automatically to raise the clincher a sufficient distance to position the surface level of the work a predetermined distance below the driver regardless of variations in the surface level of the work, and positively to hold it in such position during a driving operation.

38. A box-making machine comprising a staple driver, a staple clincher located beneath the staple driver a sufficient distance to permit the work to pass freely between the driver and the clincher, means to feed the work between the driver and the clincher, and means automatically to raise the clincher a sufficient distance to position the surface level of the work a predetermined distance below the driver regardless of variations in the surface level of the work and positively to hold it in such position during a driving operation.

39. A box-making machine comprising a staple driver, a staple clincher located beneath the staple driver a sufficient distance to permit the work to pass freely between the driver and the clincher, means to feed the work between the driver and the clincher, means automatically to raise the clincher a sufficient distance to position the surface level of the work a predetermined distance below the driver regardless of variations in the surface level of the work and positively to hold it in such position during a driving operation, and means to move the clincher with the work during a driving operation.

40. A box-making machine comprising a staple driver, a staple clincher located beneath the staple driver a sufficient distance to permit the work to pass freely between the driver and the clincher, means to feed the work between the driver and the clincher, means automatically to raise the clincher a sufficient distance to position the surface level of the work a predetermined distance below the driver regardless of variations in the surface level of the work and hold it in such position during a driving operation, and means to move the clincher with the work during a driving operation at a speed in excess of the speed of the movement of the work.

41. A wirebound box-making machine comprising stapling mechanism including a staple driver, a housing therefor, a staple clincher, means to feed box parts over the clincher, and means to raise the clincher until the upper surface of the work contacts the housing and positively to hold the work in such position during a driving operation.

42. A machine for stapling binding wire to box parts comprising, in combination, a conveyer to feed the box parts continuously, stapling mechanism operable upon the moving box parts, and clinching mechanism operable upon the moving box parts; the stapling mechanism being housed in a stationary housing and having a staple former and a staple driver movable within the housing in the direction of the movement of the box parts, and the clinching mechanism being automatically adjustable to present the surface level of the box parts uniformly to the stapling mechanism regardless of the variations in the surface level of the box parts.

43. A machine for stapling binding wire to box parts comprising, in combination, a conveyer to feed the box parts continuously, stapling mechanism operable in a stationary housing upon the moving box parts, clinching mechanism operable upon the moving box parts, and an electrical circuit for controlling the operations of said mechanisms.

44. A machine for stapling binding wire to box parts comprising, in combination, a conveyer to feed the box parts continuously, stapling mechanism operable upon the moving box parts, clinching mechanism operable upon the moving box parts, binding wire feeding means, and an electrical circuit for controlling the operations of said mechanisms.

45. In a machine for stapling binding wire to box parts having staple-driving mechanism and means to feed box parts thereto, a binding wire feed mechanism comprising a driven feed roller and an idler feed roller relatively located to form an S shape in a binding wire trained over said rollers, and means to drive the driven roller at a peripheral speed in excess of the speed of the box part feeding means whereby when the coils of the S-shaped wire are tightened over said rollers the wire will be fed faster than the box parts and when the coils of the S-shaped wire are loosened over said rollers the wire will slip on the rollers.

46. In a box-making machine having fastener-setting mechanism, means to feed box parts to said mechanism comprising a flexible band perforated at spaced intervals and trained over a wheel at each end of the machine, the wheels having spaced studs extending from their peripheries to enter perforations in the flexible band, and the ends of the band being overlapped and clamped together to provide an endless conveyer.

47. In a box-making machine having fastener-setting mechanism, means to feed box parts to said mechanism comprising a flexible band perforated at spaced intervals and trained over a wheel at each end of the machine, the wheels having spaced studs extending from their peripheries to enter perforations in the flexible band, and the ends of the band being connected together to provide an endless conveyer.

48. In a box-making machine having fastener-setting mechanism, means to feed box parts to said mechanism comprising a wheel adjacent each end of the machine and an endless flexible band conveyer trained over said wheels; the endless band comprising a plurality of pieces of band metal adjustably clamped together and perforated at spaced intervals, and the wheels having spaced studs extending from their peripheries to enter perforations in the endless conveyer band.

49. In a machine for stapling binding wire to box parts having staple-driving mechanism and means to feed box parts thereto; a binding wire feed mechanism comprising a feed roller over which the binding wire is trained, and means to rotate the feed roller at a peripheral speed in excess of the speed of the box part feeding means whereby when the wire is tightened over the feed roller the frictional engagement of the wire and the roller will cause the wire to be fed faster than the box part and when the wire is loosened over the roller the wire will slip on the roller.

50. In a machine for stapling binding wire to box parts having staple driving mechanism and means to feed box parts thereto; a binding wire feed mechanism comprising a rotatable member over which the binding wire is trained, and means to rotate said member whereby when the wire is tightened over said member the frictional engagement of the wire and the member will cause the wire to be fed and when the wire is loosened over said member the speed of movement of the wire will be reduced.

51. In a box-making machine having staple-driving mechanism and a rotatable shaft for operating said mechanism, means to control the rotation of the rotatable shaft comprising a drive pulley, means to clutch the drive pulley to the rotatable shaft, a brake for the rotatable shaft, a rock shaft to operate said clutch and said brake, and a cam on the rotatable shaft to rock the rock shaft.

52. In a box-making machine having staple-driving mechanism and a rotatable shaft for operating said mechanism, means to control the rotation of the rotatable shaft comprising a drive pulley, means to clutch the drive pulley to the rotatable shaft, a brake for the rotatable shaft, a rock shaft to operate said clutch and said brake, and means on the rotatable shaft to rock the rock shaft.

53. In a box-making machine having staple-driving mechanism and a rotatable shaft for operating said mechanism, means to control the rotation of the rotatable shaft comprising a drive pulley, means to clutch the drive pulley to the rotatable shaft, a brake for the rotatable shaft, and means carried by the rotatable shaft to operate said clutch and said brake.

54. In a box-making machine having work-feeding means, stapling mechanism comprising a constant-stroke staple former movable by and with the work.

55. In a box-making machine having work-feeding means, stapling mechanism comprising a constant-stroke staple former movable by and with the work and a staple driver operable in the staple former.

56. In a box-making machine having work-feeding means, a staple former reciprocable a uniform distance and movable by and with the work.

57. In a box-making machine having work-feeding means, a staple former reciprocable a uniform distance and movable by and with the work, and a staple driver operable in the staple former.

58. In a box-making machine having fastener-setting mechanism, means to feed box parts to said mechanism comprising a flexible band trained over a pair of spaced rotatable members, with the ends of the band overlapped and clamped together to provide an endless conveyer.

59. In a box-making machine having fastener-setting mechanism, means to feed box parts to said mechanism comprising a flexible band trained over a pair of spaced rotatable members, with the ends of the band adjustably connected together to provide an endless conveyer of adjustable length.

60. In a box-making machine having fastener-setting mechanism, means to feed box parts to said mechanism comprising a pair of spaced rotatable members and an endless flexible band conveyer trained over said members; the endless band comprising a plurality of pieces clamped together.

61. In a box-making machine having fastener-setting mechanism, means to feed box parts to said mechanism comprising a pair of spaced rotatable members and an endless flexible band conveyer trained over said members; the endless band comprising a plurality of pieces adjustably connected together to permit varying the effective length of the band conveyer.

ALFRED L. ROSENMUND.